(12) United States Patent
Kato et al.

(10) Patent No.: US 6,302,080 B1
(45) Date of Patent: Oct. 16, 2001

(54) FUEL INJECTION SYSTEM HAVING PRE-INJECTION AND MAIN INJECTION

(75) Inventors: Masaaki Kato; Toshiyuki Yoda, both of Kariya; Kenji Date, Obu, all of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/352,197

(22) Filed: Jul. 13, 1999

(30) Foreign Application Priority Data

| Jul. 31, 1998 | (JP) | 10-217607 |
| Oct. 13, 1998 | (JP) | 10-290392 |
| Dec. 15, 1998 | (JP) | 10-356324 |

(51) Int. Cl.$^7$ ............... F02B 3/10; F02M 45/08
(52) U.S. Cl. ............ 123/295; 123/299; 239/464; 239/533.4
(58) Field of Search ............... 123/295, 299, 123/300; 239/464, 533.4, 533.5

(56) References Cited

U.S. PATENT DOCUMENTS

| 4,365,746 | 12/1982 | Tanasawa et al. | 239/125 |
| 4,628,881 | * 12/1986 | Beck et al. | 123/447 |
| 4,721,253 | * 1/1988 | Noguchi et al. | 239/464 |
| 5,170,945 | 12/1992 | Daly et al. | 239/585.4 |
| 5,551,391 | * 9/1996 | Beck et al. | 123/305 |
| 5,694,903 | 12/1997 | Ganser | 123/496 |

FOREIGN PATENT DOCUMENTS

| 3-175148 | 7/1991 | (JP) . |
| 4-252830 | 9/1992 | (JP) . |
| 5-24956 | 4/1993 | (JP) . |

OTHER PUBLICATIONS

Akagi et al., "A New Accumulator Fuel Injection System for Direct Injection Diesel Engines", Sep. 1982 pp. 61–69.

Hashizume et al, "Combustion and Emission Characteristics of Multiple Stage Diesel Combustion ,New ACE Institute Co., Ltd.", 12 pages, SAE 980505.

* cited by examiner

Primary Examiner—Andrew M. Dolinar
(74) Attorney, Agent, or Firm—Nixon & Vanderhye P.C.

(57) ABSTRACT

The angle of fuel spray at the time of pre-injection is set to a wider angle of spray and the angle of fuel spray at the time of main injection is set to a narrower angle of spray. The pre-injection timing is set so that when fuel spray after the pre-injection is diffused in a cylinder and stratified, the stratified fuel spray is ignited by a rise in the pressure in the cylinder in association with movement of a piston from the bottom dead center to the top dead center. The main injection timing is set so that when the spray stratified by the pre-injection is burned, the fuel spray injected by the main injection passes through the combustion zone while being ignited in the combustion zone, reaches a combustion chamber of the piston, and is burned in the combustion chamber.

11 Claims, 27 Drawing Sheets

LIFT : h10

LIFT : h10+h20

FUEL INJECTION SYSTEM HAVING PRE-INJECTION AND MAIN INJECTION

CROSS REFERENCE TO RELATED APPLICATION

This application relates to and incorporates herein by reference Japanese Patent Applications No. 10-217607 filed on Jul. 31, 1998, No. 10-290392 filed on Oct. 13, 1998 and No. 10-356324 filed on Dec. 15, 1998.

BACKGROUND OF THE INVENTION

1. Field of the Invention

The invention relates to a fuel injection system for directly injecting fuel into a cylinder of an internal combustion engine and, more particularly, to a fuel injection system for performing fuel injections a plurality of times per cycle of an internal combustion engine.

2. Related Art

There is known a fuel injection system which accumulates high pressure fuel supplied from a fuel pump in a common rail, and supplies the accumulated high pressure fuel to a fuel injector which responsively open at a predetermined fuel injection timing, thereby directly injecting the fuel into a cylinder of an internal combustion engine.

This fuel injection system is used not only for a diesel engine for compressing and igniting fuel mixture but also a gasoline engine for igniting the fuel mixture by a spark generated by a spark plug. In recent years, combustion efficiency is improved by executing an injection of fuel from the fuel injector by a pre-injection and a main injection per cycle of the internal combustion engine, as proposed in JP-A 4-252830 and SAE 980505, for instance.

In such conventional fuel injection systems, however, since it is set so that the half or more of the entire fuel to be injected into the cylinder of the internal combustion engine is injected by the pre-injection and the fuel is distributed into the whole area in the cylinder, the mixture in the whole area in the cylinder becomes lean by the pre-injection. The fuel mixture is partially pre-ignited by compression in the cylinder by movement of a piston, thereby tending to cause knocking. When the occurrence of the knocking is tried to be suppressed, preferable engine performance cannot be obtained.

In another fuel supply system according to U.S. Pat. No. 5,694,903 for supplying a fuel from a high pressure fuel supplying pump to a fuel injector, a needle lift is changed by a fuel pressure to vary a characteristic of the rate of injection. In this fuel injection system, however, it is necessary to change a driving power supplied to a solenoid in two phases, thus resulting in a complicated and expensive driving system.

Although the rate of injection can be variably controlled, variable control of spray conditions such as the angle of spray and spray penetration cannot be realized. When the spray conditions are not properly controlled, the fuel consumption worsens and production of NOx, soot, HC, and the like increases.

Further, JP-U-5-24956 discloses a swirl type fuel injector for promoting atomization of fuel and controlling spray characteristics, for example, a fuel injector in which a member for swirling a fuel is provided in the nozzle body, JP-A 3-175148 discloses a fuel injector in which a needle is provided with a fuel swirling mechanism, and U.S. Pat. No. 5,170,945 discloses a fuel injector in which a spray pattern of a fuel is changed by a lift of the needle. It is, however, difficult to obtain a preferable spray pattern.

SUMMARY OF THE INVENTION

It is a first object of the invention to reduce NOx, HC, and soot exhausted from an internal combustion engine and, further, to improve fuel consumption and output of the internal combustion engine while suppressing occurrence of knocking due to pre-ignition of fuel mixture injected by a pre-injection.

It is a second object of the invention to provide a fuel injection system which can supply fuel at a proper rate of injection under proper spray conditions in accordance with the operating conditions of an internal combustion engine.

It is a third object of the invention to provide a fuel injection system using a fuel injector whose angle of fuel spray is variable.

In a fuel injection system according to a first aspect of the invention, when a pre-injection and a main injection are executed, a fuel injector is controlled so that fuel injected by the pre-injection is formed into a stratified spray of uniform mixture concentration in a predetermined zone in the cylinder at an ignition timing after the pre-injection, and fuel injected by the main injection is ignited in a combustion zone of the stratified spray made by the pre-injection, passes through the combustion zone, and reaches a combustion chamber in a piston, which has therein un-used air.

In order to stratify the fuel spray injected by the pre-injection, for example, it is sufficient to widen the angle of fuel spray from the fuel injector and weaken the penetration of the fuel spray so as not to diffuse the fuel spray in a wide range after the fuel injection. In order to allow the fuel spray injected by the main injection to penetrate the combustion zone of the stratified spray made by the pre-ignition, it is sufficient to narrow the angle of fuel spray from the fuel injector to thereby enhance the penetration of the fuel spray.

In a fuel injection system according to a second aspect of the invention, a needle which opens and closes the nozzle hole is lifted in stages, thereby changing the rate of injection and the spray conditions of a fuel injected according to the lift of the needle. The spray characteristics such as the rate of injection, the angle of spray, and the penetration can be changed according to the needle lift amount and a fuel can be atomized at low pressure. Thus, the fuel consumption can be improved and occurrence of NOx, soot, HC, and the like can be reduced.

In a fuel injection system according to a third aspect of the invention, a first swirl generating chamber is formed in a nozzle body, and a first swirl generating part having an outer wall in which a first fuel inlet passage communicated with the first swirl generating chamber is formed is provided on the outer surface of a needle. The outer surface of the first swirl generating part in which the first fuel inlet passage is formed faces the inner surface of the nozzle body in which a valve seat member is formed. Consequently, according to a lift of the needle, the distance between the outer surface of the first swirl generating part and the inner surface of the nozzle body in which the valve seat member is formed changes, and the opening area defined by a contact part of the needle and the valve seat member changes. An axial component of fuel flowing through the first swirl generating part is thereby adjusted and the ratio between the circumferential component of fuel flowing through the first fuel inlet passage and an axial component of fuel flowing through the first swirl generating part is adjusted.

BRIEF DESCRIPTION OF THE DRAWINGS

The above and other objects, features and advantages of the present invention will become more apparent from the following detailed descriptions made with reference to the accompanying drawings. In the drawings.

DETAILED DESCRIPTION OF PREFERRED EMBODIMENTS

Embodiments of the invention will be described hereinbelow with reference to the drawings.

(FIRST EMBODIMENT)

Figure 1:
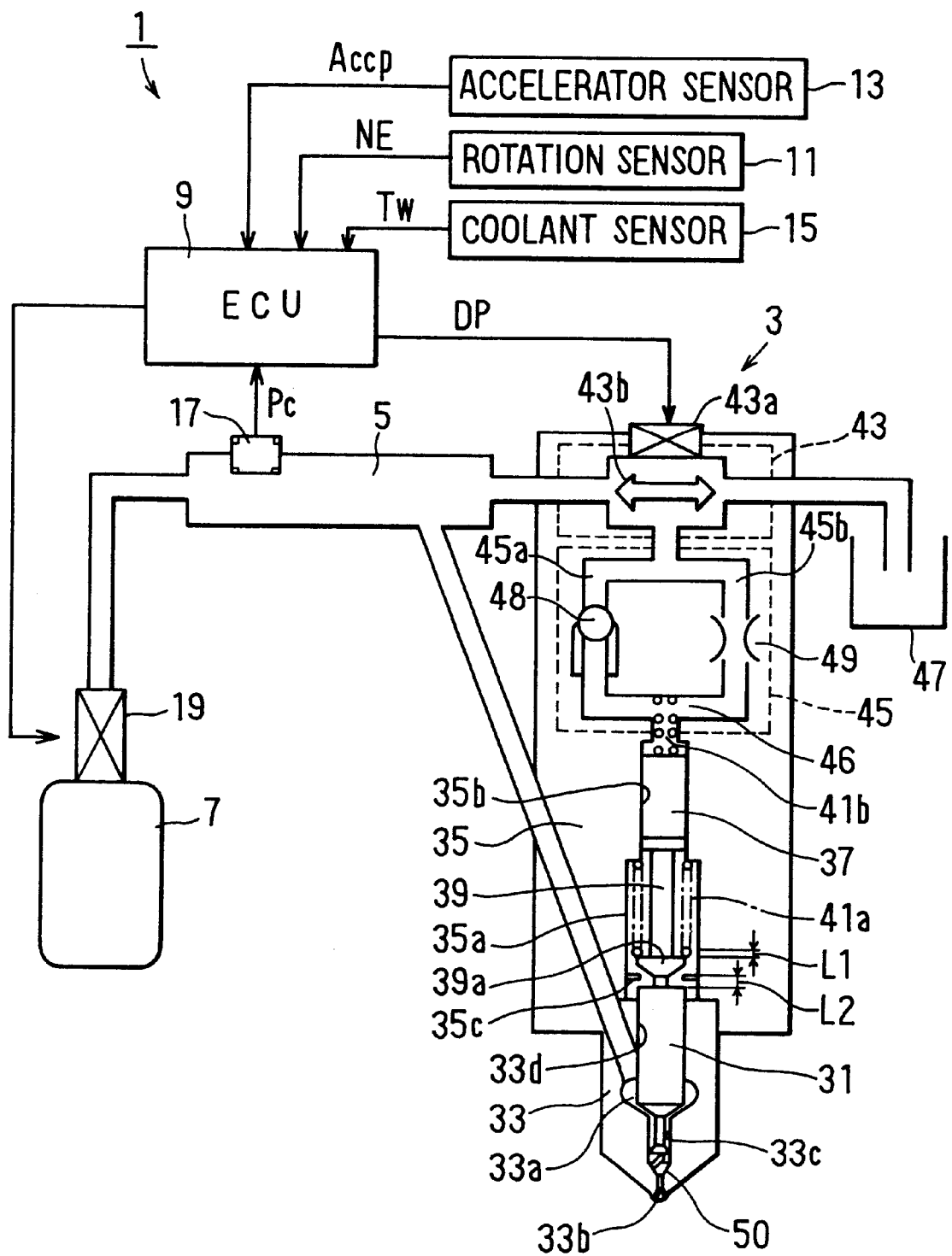
FIG. 1 is a block diagram showing a fuel injection system according to a first embodiment of the invention.

A fuel injection system 1 of the embodiment comprises, as shown in FIG. 1, a fuel injector (injector) 3 for injecting fuel into each of cylinders of a diesel engine (not shown), a pressure accumulation chamber (common rail) 5 for accumulating high pressure fuel to be supplied to the injector 3, fuel pump 7 for supplying the high pressure fuel into the common rail 5, and an electronic control unit (ECU) 9 for controlling those components.

The ECU 9 is constructed by a microcomputer whose main components are a CPU, a ROM, a RAM, and the like. The ECU 9 receives sensor signals from various sensors for sensing operating conditions of the engine, such as a rotation sensor 11 for sensing a rotation angle of a diesel engine output shaft, an accelerator sensor 13 for sensing an accelerator operation amount (accelerator position) by a driver, and a coolant temperature sensor 15 for sensing the temperature of cooling water of the diesel engine and controls fuel injection quantity from the injector 3 into an engine cylinder, an injection timing, and the like on the basis of rotational speed NE of the diesel engine, accelerator position Accp, cooling water temperature Tw, and the like obtained by sensor signals from the sensors.

The common rail 5 is provided with a pressure sensor 17 for sensing fuel pressure Pc (common rail pressure) in the common rail 5. The fuel pump 7 is provided with a metering valve 19 for regulating fuel quantity supplied to the common rail 5. The ECU 9 receives a sensor signal from the pressure sensor 17 and controls the opening angle of the metering valve 19 so that the common rail pressure Pc (fuel injection pressure from the injector 3) becomes an optimum pressure according to the operating conditions of the diesel engine.

The injector 3 is inserted in the cylinder head of the diesel engine so as to inject the high pressure fuel supplied from the common rail 5 into a combustion chamber formed in a piston which reciprocates in the cylinder of the diesel engine.

The basic construction of the injector 3 is similar to that which is conventionally used for the common rail type fuel injection system. In the embodiment, the angle of spray in the event of fuel injection can be changed according to the pulse width of a driving pulse DP generated from the ECU 9.

Specifically, the injector 3 is comprised of a nozzle body 33 in which a needle 31 is housed movably and an injector body 35 having therein a driving system for opening and closing the injector 3 by displacing the needle 31 by using the high pressure fuel in the common rail 5. In the nozzle body 33, a fuel chamber 33a for temporarily storing the high pressure fuel supplied from the common rail 5, fuel path 33c for leading the high pressure fuel in the fuel chamber 33a to a nozzle hole 33b, and a needle insertion hole 33d into which the needle 31 can be inserted from the side opposite to the fuel path 33c of the fuel chamber 33a and which slidably supports the inserted needle 31 coaxially with the fuel path 33c.

The tip on the side of the fuel chamber 33a of the needle 31 is formed in a taper shape so as to interrupt a flow of the fuel from the fuel chamber 33a into the fuel path 33c (and to the nozzle hole 33b) by being in contact with the opening on the fuel chamber 33a side of the fuel path 33c. From the center of the tip, a guide part 50 for swirling the high pressure fuel supplied through the fuel path 33c to the nozzle hole 33b is projectingly provided.

The rear end of the nozzle body 33 is fixedly fit into the injector body 35. In the injector body 35, a first hole 35a having a large diameter to receive the needle 31 projected from the rear end of the nozzle body 33 is opened. Further, on the side opposite to the needle 31 of the first hole 35a, a second hole 35b having a diameter smaller than that of the first hole 35a, in which a piston 37 is slidably provided is opened.

A rod 39 for connecting the needle 31 and the piston 37 is provided between the needle 31 and the piston 37, which extends in the center of the first hole 35a. On the inner wall of the first hole 35a, a hollow regulation plate 35c is provided. The regulation plate 35c comes into contact with the rear end of the needle 31 when the needle 31 moves backward, that is, when the needle 31 frees the fuel path 33c extending from the fuel chamber 33a to the nozzle hole 33b to allow the fuel to be injected from the nozzle hole 33b), thereby checking the backward movement of the needle 31 and regulating the maximum opening area of the path of the high pressure fuel injected from the nozzle hole 33b.

Further, on the second hole 35b side rearward of the regulation plate 35c of the first hole 35a, a coil-shaped first spring 41a whose one end is in contact with a stepped part extending from the first hole 35a to the second hole 35b is provided.

The rod 39 has a flange 39a which is in contact with the other end of the first spring 41a in a some midpoint of the backward movement of the needle 31 until the rear end of the needle 31 comes into contact with the regulation plate 35c,and temporarily checks the backward movement of the needle 31 by the biasing force of the first spring 41a.

The side opposite to the first hole 35a of the second hole 35b is communicated with a control chamber 46 in which the fuel pressure is controlled by a three-position valve 43 and a one-way orifice 45. The end face on the opposite side of the rod 39 of the piston 37 receives the force of biasing the needle 31 toward the fuel path 33c from a coil-shaped second spring 41b provided in the control chamber 46. The second spring 41b has a diameter smaller than that of the first spring 41a and generates a biasing force smaller than that of the first spring 41a.

The three-position valve 43 is provided in the fuel path extending from the common rail 5 to fuel tank 47. In the normal times when an electric current is not supplied to a solenoid 43a, a valve body 43b closes the port on the fuel tank 47 side to lead the high pressure fuel from the common rail 5 to the control chamber 46 via the one-way orifice 45. When the current is supplied to the solenoid 43a, the valve body 43b is moved to the port on the common rail 5 side to close the port and the one-way orifice 45 and the fuel tank 47 are communicated with each other, thereby decreasing the fuel pressure in the control chamber 46.

The one-way orifice 45 comprises: fuel paths 45a and 45b of two channels each communicating the port on the one-way orifice 45 side of the three-position valve 43 and the control chamber 46; a nonreturn valve 48 which is provided in one, 45a, of the fuel paths, permits the fuel flowing from the three-position valve 43 into the second hole 35b side, and checks the flow of the fuel in the opposite direction; and a throttle 49 which is provided for the other fuel path 45b and restricts the quantity of fuel flowing through the fuel path 45b.

Figure 2A:
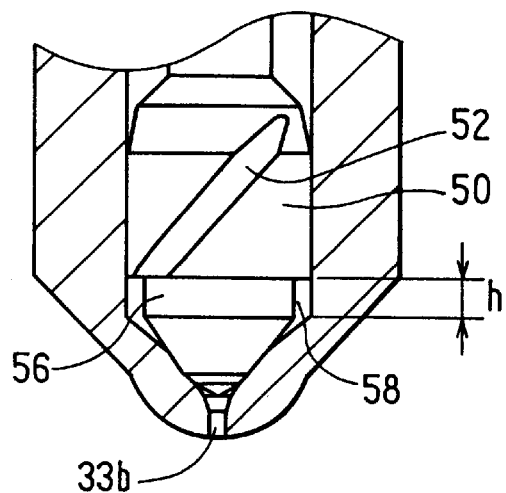
FIGS. 2A and 2B are enlarged views showing guide parts of fuel injectors used in the first embodiment and in a comparative example system, respectively.

As shown in FIG. 2A, the guide part 50 is constructed slidably in the fuel path 33c. In the center of the side wall of the guide part 50, an oblique groove 52 to swirl the high pressure fuel flowing through the fuel path 33c to the nozzle hole 33b is formed.

Figure 2B:
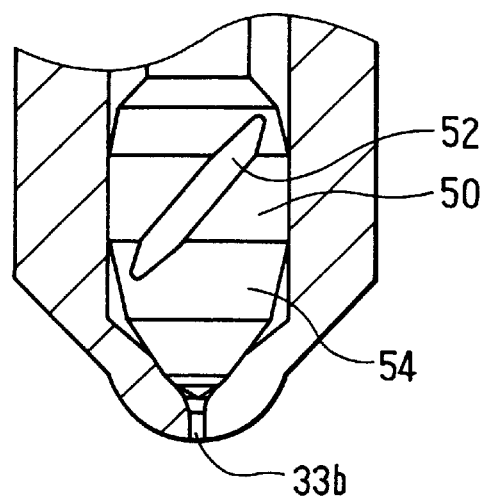

In a fuel injector shown as a comparative example, as shown in FIG. 2B, a part from the center of the guide part 50 in which the oblique groove 52 is formed to the tip which comes into contact with the inner wall of the nozzle hole 33b is formed to have a taper face 54 whose diameter gradually decreases toward the tip, thereby creating an almost constant swirl flow irrespective of a needle lift amount. In the injector 3 of the embodiment, however, as shown in FIG. 2A, the part from the center of the guide part 50, in which the oblique groove 52 is formed, to the tip which comes into contact with the inner wall of the nozzle hole 33b is formed in a cylindrical shape along the center axis of the guide part 50, thereby forming a swirl chamber 58 defined by the outer wall of a cylindrical part 56 and the inner wall of the fuel path 33c.

Consequently, in the injector 3 of the embodiment, the shape of the swirl chamber 58 (specifically, height (h) along the axial direction) changes according to the needle lift amount. When the height (h) of the swirl chamber 58 changes, the fuel flow from the oblique groove 52, having a velocity vector in the oblique direction changes the ratio between an axial velocity component of the guide part 50 and a circumferential velocity component of the swirl chamber 58 of the velocity vector. The change is caused by a variation in a radial rectification in fuel outlet part through which the fuel flows from the oblique groove 52 to the nozzle hole 33b side and a variation in the fuel inertia according to a swirl chamber volume. The variations occur at a height (ho) of the swirl chamber 58. The change in the velocity direction component ratio appears as a change in the angle of spray of the fuel injected from the nozzle hole 33b.

In the injector 3 of the embodiment constructed as described above, when no current, that is no driving pulse DP, is supplied to the solenoid 43a of the three-position valve 43, the high pressure fuel in the common rail 5 flows via the three-position valve 3 and the one-way orifice 45 into the control chamber 46. As a result, the piston 47, rod 39 and needle 31 are energized to the nozzle hole 33b side by the high pressure fuel flowed in the control chamber 46 and the taper face of the needle 31 comes into contact with the opening on the fuel chamber 33a side of the fuel path 33c to thereby close the fuel path 33c, so that the injector 3 enters fuel stop state.

On the other hand, when the current or the driving pulse DP is supplied to the solenoid 43a, the control chamber 46 is communicated with the fuel tank 47 via the throttle 49. Since the taper face of the needle 31 receives the pressure of the high pressure fuel supplied from the common rail 5 into the fuel chamber 33a of the nozzle body 33, the needle 31, rod 39, and piston 37 are moved backward by the pressure. The fuel path 33c is consequently freed and the fuel injection from the nozzle hole 33b is started.

At the time of the movement, since the biasing force of the second spring 41b is applied only to the piston 37 in the beginning, the elements quickly move backward. When the movement amount (needle lift amount) L reaches a predetermined amount (L1 shown in FIG. 1) and the flange 39a comes into contact with the first spring 41, the movement of the elements is temporarily stopped by the biasing force of the first spring 41a.

Figure 3:
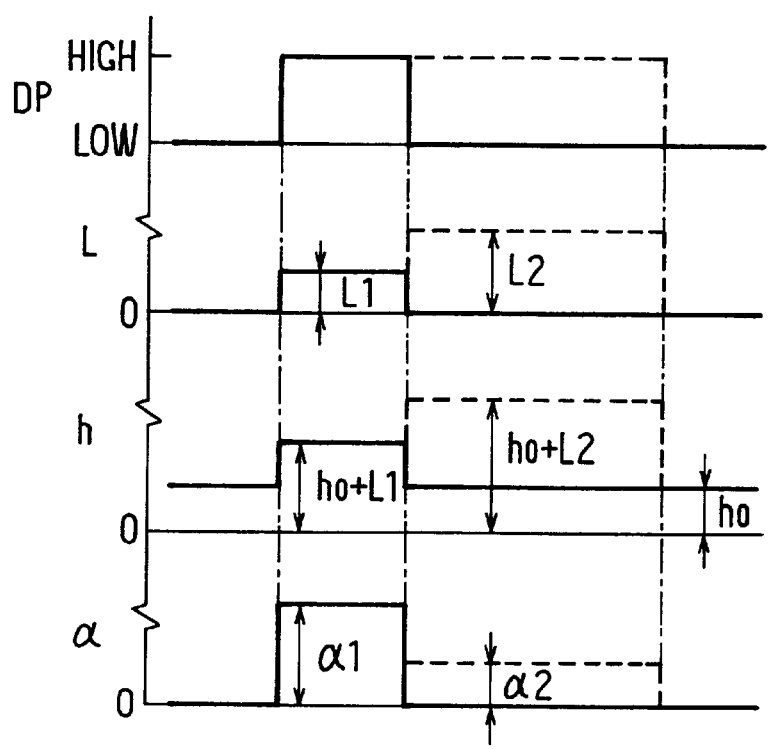
FIG. 3 is a timing diagram showing the operation of the fuel injector in the first embodiment.

At this time, the height (h) of the swirl chamber 58 becomes a height (ho+L1) obtained by adding the needle lift amount L1 to the height ho in the initial state where the nozzle hole 33b is closed. In this state, however, the volume of the swirl chamber 58 is small and the fuel inertia is small, so that the circumferential velocity component of the fuel flowing from the oblique groove 52 of the guide part 50 to the nozzle hole 33b side is strongly maintained and the angle of spray of the fuel injected from the nozzle hole 33b becomes a wider angle al of spray (FIG. 3).

When the needle lift amount L becomes the predetermined amount L1 and the supply of the current to the solenoid 43a is continued in a state where the elements are stopped, the fuel pressure in the control chamber 46 gradually decreases. At the time point when the supply of current to the solenoid 43a reaches predetermined time, the needle 31, rod 39, and piston 37 are again moved backward against the biasing force of the first spring 41a by the fuel pressure received on the taper face of the needle 31 and are stopped in a position where the rear end of the needle 31 comes into contact with the regulation plate 35c (position where the needle lift amount reaches L2 shown in FIG. 1).

At this time, the height (h) of the swirl chamber 58 is equal to (ho+L2) obtained by adding the needle lift amount L2 to the height ho in the initial state where the nozzle hole 33b is closed. In this state, the volume of the swirl chamber 58 increases and the fuel inertia becomes larger. The circumferential velocity component of the fuel flowing from the oblique groove 52 of the guide part 50 to the nozzle hole 33b side cannot be maintained and decreases, the axial velocity component increases, and the angle α2 of spray of the fuel injected from the fuel hole 33b becomes a narrower angle α2 of spray (FIG. 3).

In the injector 3 of the embodiment as described above, when the time of current supply to the solenoid 43a of the three-position valve 43 is short, the fuel is injected at the wider angle α1 of spray. When the time of the current supply to the solenoid 43a is increased, the wider angle α1 of spray of the fuel is changed to the narrower angle α2 of spray.

The ECU 9 sets the pulse width of the driving pulse DP of the three-position valve 43 for instructing the supply of current to the solenoid 43a by using the characteristics of the injector 3, thereby switching the angle of spray of the fuel from the injector 3 between the main injection of the fuel and the pre-injection for ignition which is performed prior to the main injection.

Figure 4A:
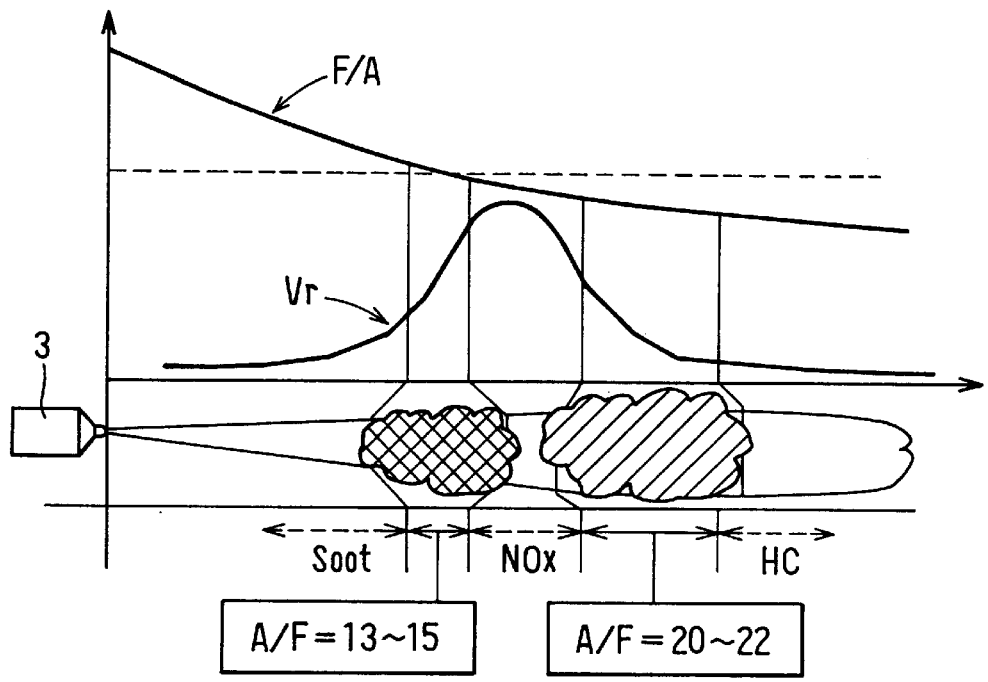
FIGS. 4A, 4B, and 4C are schematic diagrams showing a fuel injection control executed in the first embodiment.
Figure 4B:
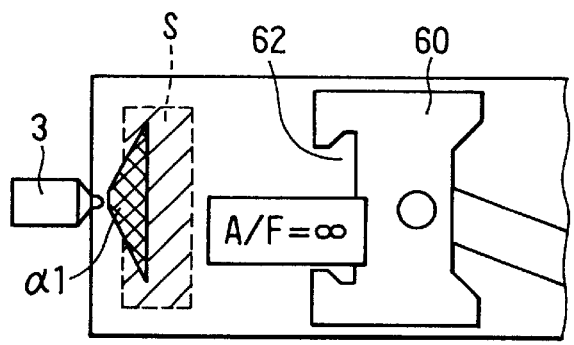
Figure 4C:
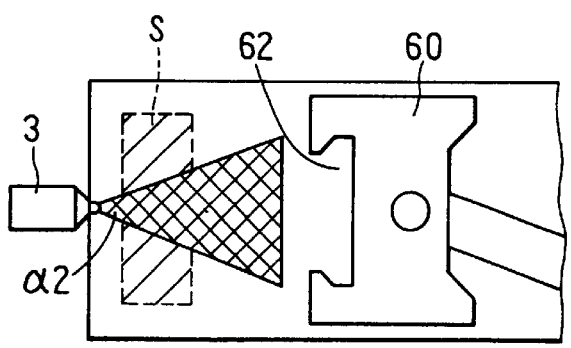

To be specific, when the fuel injection per stroke of the diesel engine is performed by the pre-injection and the main injection, the ECU 9 sets the angle of fuel spray in the event of the pre-injection as the wider angle α1 (FIG. 4B) and sets the angle of fuel spray in the event of the main injection as the narrower angle α2 of spray (FIG. 4C).

The timing of the pre-injection (fuel injection timing) is set so that when the fuel spray after the pre-injection diffuses into the cylinder and becomes stratified (S in FIG. 4B), the stratified fuel spray is ignited by pressure rise in the cylinder associated with the movement of the piston 60 from the bottom dead center to the top dead center. The timing of the main injection (fuel injection timing) is set so that the main injection is executed when the stratified fuel spray formed by the pre-injection is ignited and burned, the fuel spray at the narrower angle of spray by the main injection penetrates the combustion zone while being ignited in the combustion zone (FIG. 4C), reaches the combustion chamber 62 formed at the end face of the piston and is burned in the combustion chamber 62, and heat generated by the combustion becomes the maximum after the top dead center of the piston 60.

When the driving pulse DP of the injector 3 is shortened to widen the angle of fuel spray of the pre-injection, the fuel injection quantity by the pre-injection decreases. In the embodiment, however, by shortening the driving pulse DP of the pre-injection to decrease the fuel injection quantity of the pre-injection, the air-fuel (A/F) ratio of the fuel spray when the fuel spray stratified after the pre-injection is ignited and burned becomes a lean air-fuel ratio (A/F; 20 to 22) within an inflammable range shown in FIG. 4A where NOx and HC are not produced and the fuel spray by the pre-injection is burned at a low temperature, that is, cool flame combustion.

On the other hand, when the driving pulse DP of the injector 3 is made longer to narrow the fuel spray angle of the main injection, the fuel injection quantity by the main injection becomes extremely large as compared with that by the pre-injection. In the embodiment, however, by increasing the fuel injection quantity by the main injection, the fuel quantity necessary to operate the diesel engine is assured by the main injection. Moreover, the air-fuel (A/F) ratio at the time of combustion of the fuel spray by the main injection becomes an air-fuel ratio (A/F; 13 to 15) about the stoichiometric air-fuel ratio shown in FIG. 4A at which soot and NOx are not produced, so that the fuel is perfectly burned in the cylinder.

FIG. 4A schematically shows the relation among a state where the fuel spray injected from the injector 3 gradually diffuses in the cylinder and the fuel-air ratio (F/A: representing the inverse of the air-fuel ratio) gradually decreases (state where the air-fuel ratio gradually increases), the range of the air-fuel ratio in which the fuel can be burned without producing soot, NOx, and HC in the process of the change in the F/A ratio, and speed Vr of response of combustion when the fuel spray is ignited at each air-fuel ratio.

Figure 5:
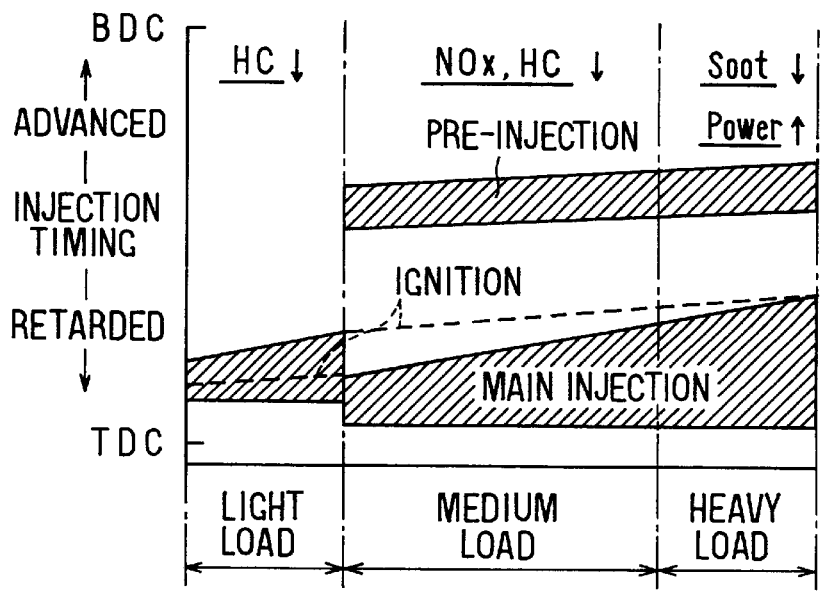
FIG. 5 is a diagram showing execution patterns of pre-injection and main injection according to engine loads in the first embodiment.

The ECU 9 limits the driving zones in which the fuel injection per stroke of the diesel engine is executed by the pre-injection and the main injection to the intermediate and high load zones of the engine as shown in FIG. 5. In a light load zone at the time of idling or the like, the fuel injection is executed once per stroke of the diesel engine.

Figure 6:
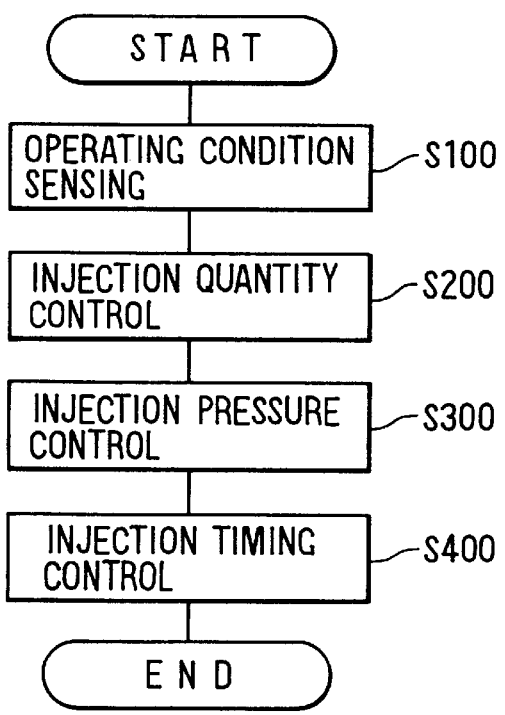
FIG. 6 is a flow diagram showing a main routine executed for fuel injection control by an ECU in the first embodiment.

The procedure of the fuel injection control executed by the ECU 9 will be described hereinbelow with reference to the flow diagrams. FIG. 6 shows the main routine repeatedly executed by the ECU 9.

As shown in FIG. 6, in S100 the ECU 9 receives sensor signals from the above-mentioned various sensors and senses the operating conditions of the diesel engine such as the rotational speed NE, accelerator position Accp, cooling water temperature Tw, and common rail pressure Pc. In the following step S200, fuel injection quantity controlling process of calculating a quantity of fuel injection supplied from the injector 3 into the cylinder on the basis of the sensed operating conditions and setting a time of supply of current to the solenoid 43a is executed.

In S300, in order to set the fuel injection pressure from the injector 3 to an optimum value corresponding to the operating conditions, fuel injection pressure controlling process for adjusting the common rail pressure Pc is executed. Further, in S400, fuel injection timing controlling process of controlling a timing of injecting the fuel (fuel injection timing) from the injector 3 into the cylinder on the basis of the sensed operating conditions of the diesel engine is performed. When the fuel injection timing control in S400 is finished, the routine is returned to S100 and the processes are repeated.

Figure 7:
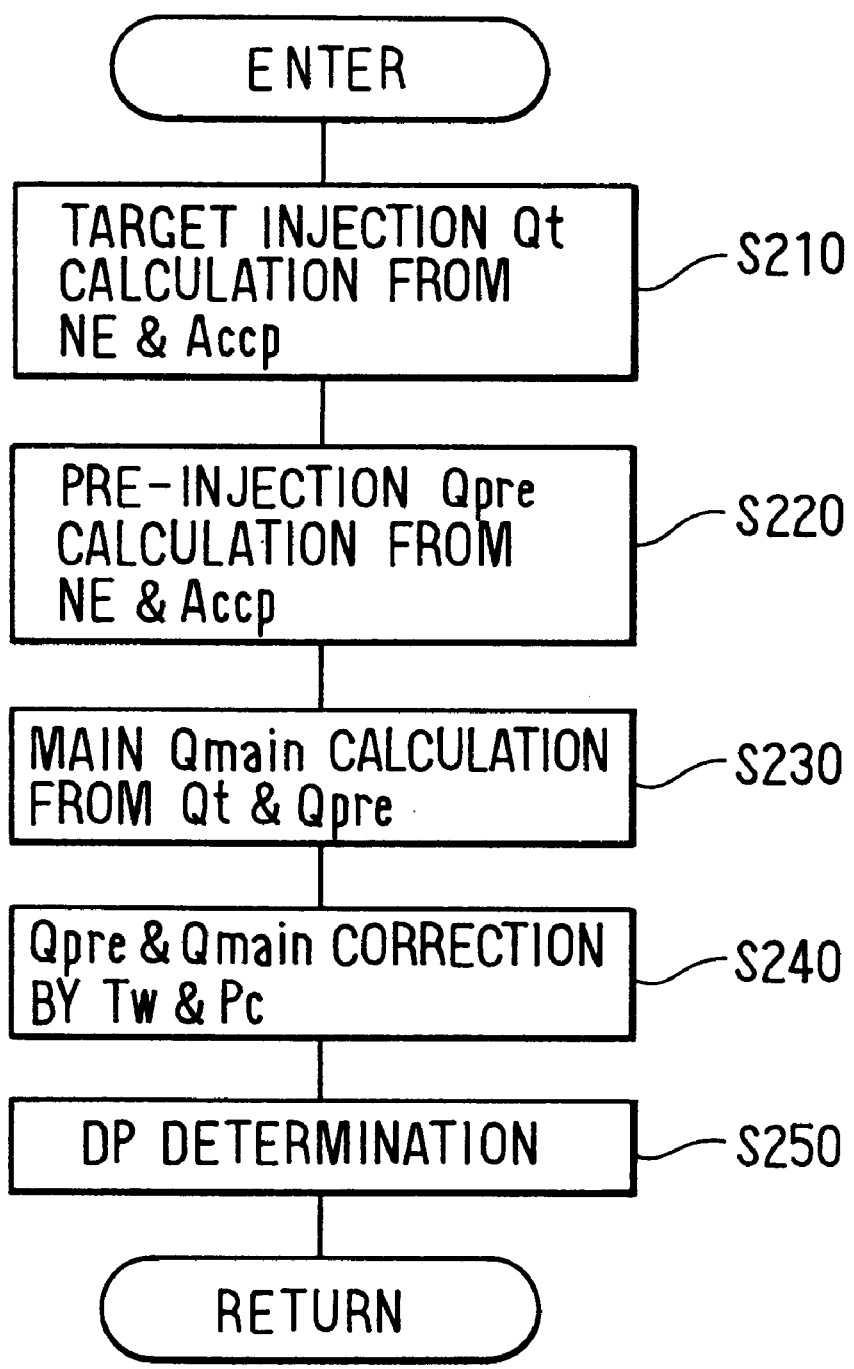
FIG. 7 is a flow diagram showing a detailed fuel injection quantity controlling process executed in the main routine of FIG. 6.

FIG. 7 is a flow diagram showing the fuel injection quantity controlling process executed in S200.

Figure 10A:
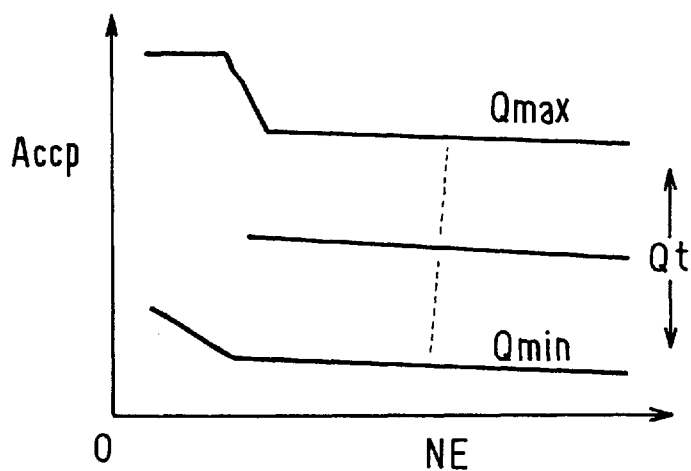
FIGS. 10A and 10B are diagrams showing data maps used in the fuel injection quantity controlling process of FIG. 7.

As shown in FIG. 7, in the process, first in S210, a target injection quantity Qt to be injected into the cylinder per cycle of the engine is calculated by using the map shown in FIG. 10A on the basis of the rotational speed NE of the diesel engine and the accelerator position Accp indicative of the engine load. In S220, a pre-injection quantity Qpre of the fuel when the fuel injection is performed by the pre-injection and the main injection is calculated by using the map shown in FIG. 10B on the basis of the rotational speed NE and the accelerator position Accp.

The map for calculating the target injection quantity shown in FIG. 10A is similar to a map generally used. It is set so that the larger the accelerator position Accp indicative of the engine load is, the target injection quantity Qt increases.

Figure 10B:
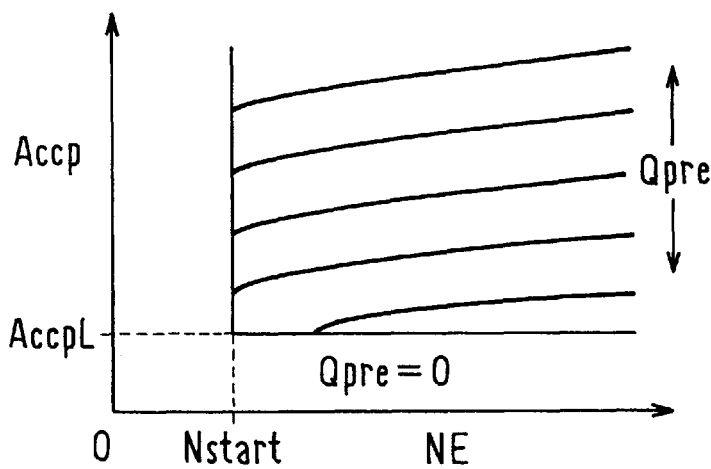

In the map for calculating the pre-injection quantity shown in FIG. 10B, the pre-injection quantity Qpre is set in accordance with the rotational speed NE and the accelerator position Accp in a zone in which the rotational speed NE is equal to or higher than a starting determination speed Nstart and the accelerator position Accp is equal to or larger than a predetermined accelerator position AccpL. The pre-injection quantity Qpre is set to 0 in the other zone for the following reason.

If the fuel injection is performed by the pre-injection and the main injection when the accelerator position Accp is smaller than the predetermined angle AccpL and the engine load is low (that is, at the time of engine light load) or when the rotational speed NE is lower than the starting determination speed Nstart just after starting of the engine, the fuel injection quantity per fuel injection is too small and the fuel spray at the time of ignition is on the side leaner than the inflammable limit. Consequently, misfire and increase in HC may be caused. In the embodiment, in order to prevent the problem, by setting the pre-injection quantity Qpre in the above-mentioned zone to 0, the pre-injection is inhibited.

After the target injection quantity Qt and the pre-injection quantity Qpre of the fuel are calculated, the routine advances to S230 where the pre-injection quantity Qpre is subtracted from the target injection quantity Qt, thereby calculating a main injection quantity Qmain (=Qt−Qpre) of the fuel. In S240, the pre-injection quantity Qpre and the main injection quantity Qmain of the fuel obtained in S220 and S230 are corrected on the basis of the various operating conditions such as the cooling water temperature Tw. In addition, intake air temperature, intake air pressure, fuel temperature, and the like may also be used. In S250, the pre-injection quantity Qpre and the main injection quantity Qmain after correction of S240 are converted into the driving pulse DP widths of the injector 3 for actually executing the pre-injection and the main injection by supplying the current to the solenoid 43a of the injector 3. The driving pulse DP widths are stored into a memory and the process returns.

Figure 8:
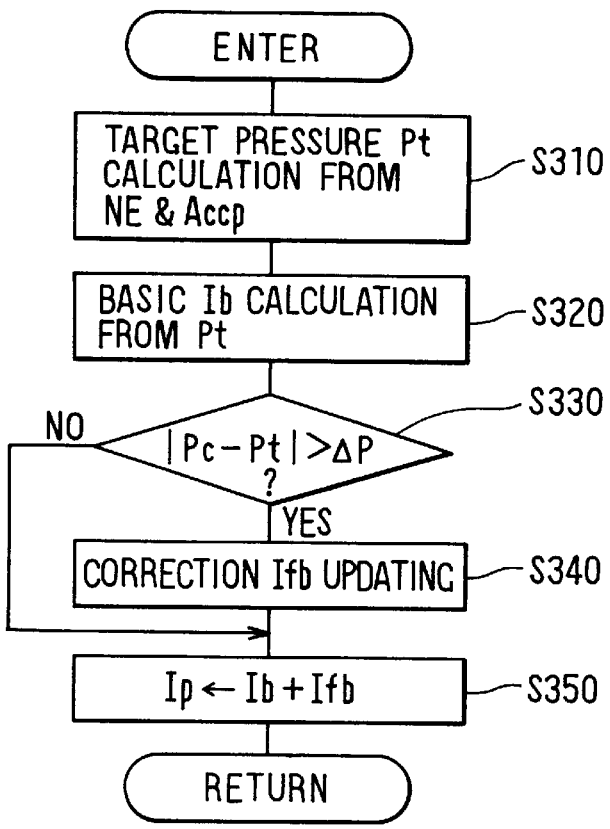
FIG. 8 is a flow diagram showing a detailed fuel injection pressure controlling process executed in the main routine of FIG. 6.

FIG. 8 is a flow diagram showing fuel injection pressure controlling process executed in S300.

Figure 11:
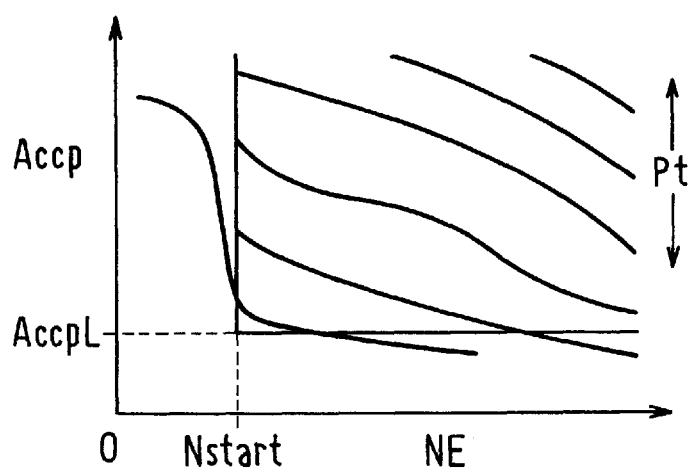
FIG. 11 is a diagram showing a data map used in the fuel injection pressure controlling process of FIG. 8.

As shown in FIG. 8, when the process is started, first in S310, the target injection pressure Pt is calculated by using the map shown in FIG. 11 on the basis of the rotational speed NE and the accelerator position Accp of the diesel engine. In S320, a basic current amount Ib supplied to the metering valve 19 is calculated from the target injection pressure Pt.

Each of the basic current amount Ib and a target current amount Ip corresponds to an amount of current supplied to the solenoid of the metering valve 19. The opening angle of the metering valve 19 is controlled by the current amount, thereby determining the fuel quantity supplied to the common rail 5.

In S330, whether the absolute value of a deviation between the common rail pressure Pc obtained by the sensor signal from the pressure sensor 17 and the target injection pressure Pt obtained in S310 exceeds a preset determination value ΔP or not Is determined. When the absolute value of the deviation between the common rail pressure Pc and the target injection pressure Pt exceeds the determination value ΔP, the routine advances to S340. When the target injection pressure Pt is higher than the common rail pressure Pc, in order to increase the common rail pressure Pc, a correction current amount Ifb for the basic current amount Ib is increased only by a predetermined value ΔI. On the contrary, when the target injection pressure Pt is smaller than the common rail pressure Pc, in order to reduce the common rail pressure Pc, the correction current amount Ifb for the basic current amount Ib is decreased only by the predetermined value ΔI. By such a procedure, the correction current amount Ifb is updated.

When the correction current amount Ifb is updated in S340 or when it is determined in S330 that the absolute value of the deviation between the common rail pressure Pc and the target injection pressure Pt does not exceed the determination value ΔP, the routine advances to S350. In S350, by adding the calculated basic current amount Ib and the correction current amount Ifb, the target current amount Ip as a final control amount used to control the metering valve 19 is determined. After that, the process returns.

Figure 9:
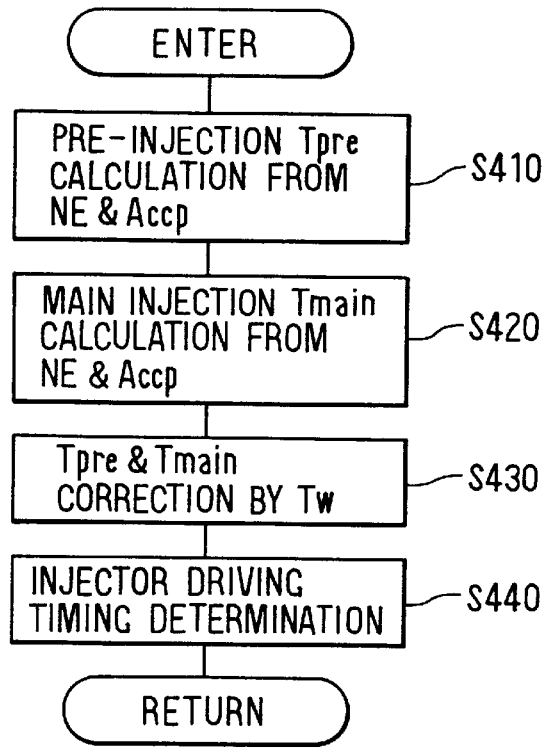
FIG. 9 is a flow diagram showing a detailed fuel injection timing controlling process executed in the main routine of FIG. 6.

FIG. 9 is a flow diagram showing the fuel injection timing controlling process executed in S400.

Figure 12A:
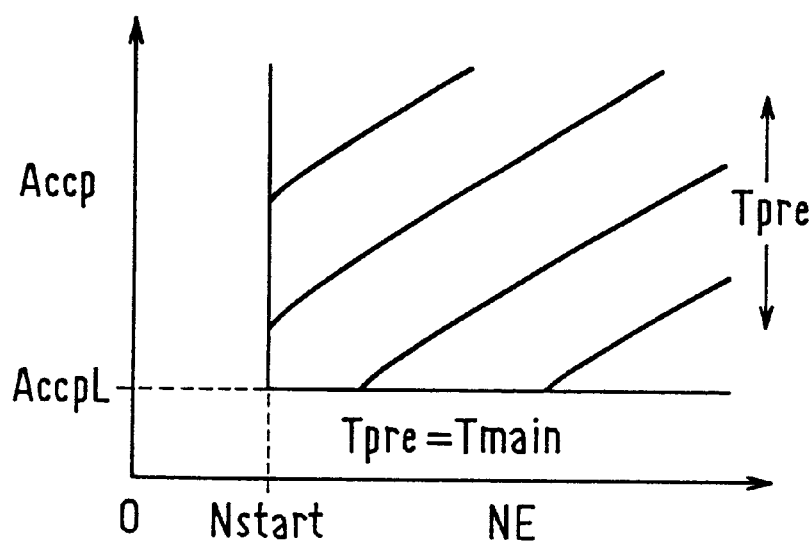
FIGS. 12A and 12B are diagrams showing data maps used in the fuel injection timing controlling process of FIG. 9.

As shown in FIG. 9, in the process, first in S410, pre-injection timing Tpre of the fuel when the fuel injection is executed by the pre-injection and the main injection is calculated by using the map shown in FIG. 12A on the basis of the rotational speed NE and the accelerator position Accp of the diesel engine. In S420, main injection timing Tmain of the fuel is calculated by using the map shown in FIG. 12B on the basis of the rotational speed NE and the accelerator position Accp of the diesel engine. Each of the pre-injection timing Tpre and the main injection timing Tmain are specified by an advance angle amount with respect to the top dead center of the piston (specifically, the rotational angle of the engine).

In the map for calculating the pre-injection timing shown in FIG. 12A, in the zone where the rotational speed NE is equal to or higher than the starting determination speed Nstart and the accelerator position Accp is equal to or larger than the predetermined accelerator position AccpL, the higher the rotational speed NE is and the larger the accelerator position Accp is, the pre-injection timing Tpre is set to be a larger value in accordance with the rotational speed NE and the accelerator position Accp. In the other area, the pre-injection timing Tpre is set to 0. As described above, it intends to inhibit the pre-injection when the accelerator position Accp is smaller than the predetermined accelerator position AccpL and the engine load is low or when the rotational speed NE is lower than the starting determination speed Nstart just after starting of the engine.

Figure 12B:
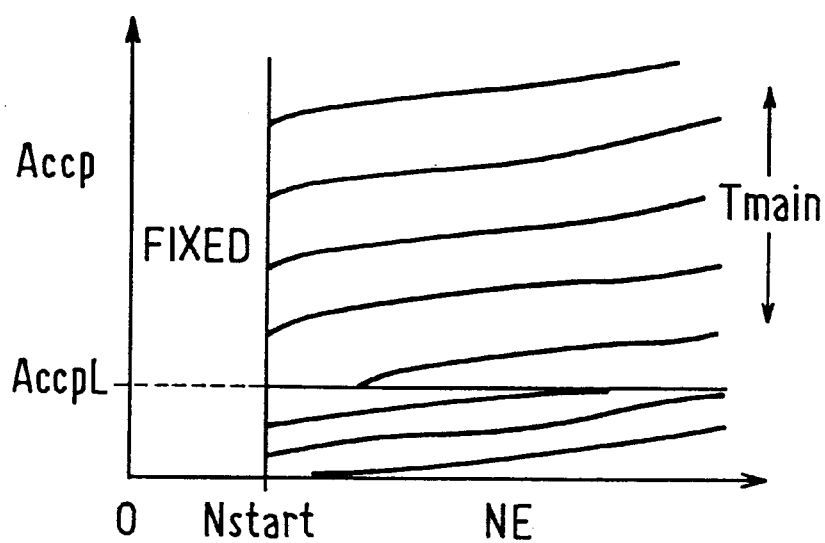

In the map for calculating the main injection timing shown in FIG. 12B, the main injection timing Tmain is set to a preset fixed value in the zone where the rotational speed NE is lower than the starting determination speed Nstart. In the zone where the rotational speed NE is equal to or higher than the starting determination speed Nstart, the main injection timing Tmain is set in accordance with the rotational speed NE and the accelerator position Accp. In the zone where the rotational speed NE is equal to or higher than the starting determination speed Nstart, patterns for calculating the main injection timing are set so that the main injection timing in the zone where the accelerator position Accp is equal to or larger than the predetermined accelerator position AccpL and the pre-injection is performed and that in the zone where the accelerator position Accp is smaller than the predetermined position AccpL and the pre-injection is inhibited are different (FIG. 5).

After the pre-injection timing Tpre and the main injection timing Tmain of the fuel are calculated as described above, the routine advances to S430 where the values are corrected on the basis of the various operating conditions such as the cooling water temperature Tw. Here, intake air temperature, intake air pressure, fuel temperature, and the like may also be used. In S440, the pre-injection timing Tpre and the main injection timing Tmain after correction of S430 are stored into a memory as driving timings of the injector 3 for allowing the pre-injection and the main injection to be actually executed by supplying the current to the solenoid 43a of the injector 3 and the process returns.

The driving timings of the injector 3 stored in the memory by the fuel injection timing controlling process and the driving pulse DP widths of the injector 3 stored in the memory by the fuel injection quantity controlling process are used to set an output timing and an output time of the driving pulse DP into a timer for outputting the driving pulse DP in an interrupting process executed synchronously with the rotation of the diesel engine. The valve of the injector 3 is opened or closed in accordance with the driving pulse DP outputted from the timer.

As described above, in the fuel injection system 1 of the embodiment, the angle of spray at the time of fuel injection from the injector 3 can be switched between the wider angle α1 of spray and the narrower angle α2 of spray in accordance with the time of supply of the current to the solenoid 43a. When the fuel injection from the injector 3 is executed by the pre-injection and the main injection, it is determined so that the ECU 9 operates as follows.

Specifically, at the time of pre-injection of the fuel, the ECU 9 controls the pre-injection quantity and the pre-injection timing so that the fuel is injected from the injector 3 at the wider angle α1 of spray, the fuel spray is stratified in the cylinder upon ignition of the fuel spray and, moreover, the air-fuel ratio of the fuel spray becomes a lean air-fuel ratio within the inflammable limit. At the time of the main injection, the ECU 9 controls the main injection quantity and the main injection timing so that the fuel is injected from the injector 3 at the narrower angle α2 of spray, and the injected fuel spray is ignited in a combustion zone of the fuel spray stratified by the pre-injection, reaches the combustion chamber 62 formed in the piston 60 and is burned in the combustion chamber 62.

According to the embodiment, therefore, the following can be prevented; the fuel spray by the pre-injection is dispersed in the whole area in the cylinder, the fuel spray is consequently pre-ignited and knocking is caused, or the fuel mixture in the cylinder becomes too lean and the lean fuel mixture is burned, thereby producing HC or causing an ignition failure (or misfire). Consequently, the spray injected by the pre-injection can be certainly ignited at a desired ignition timing.

Since the air-fuel ratio of the fuel spray stratified by the pre-injection becomes on the lean side of the inflammable mixture limit, the heat generated by the ignition is suppressed to thereby perform a cool flame combustion. Thus, NOx and soot produced by an abrupt combustion due to ignition of rich mixture can be suppressed and, further, noises can be suppressed.

The fuel of main injection is ignited in the cool frame combustion zone of the fuel spray stratified by the pre-injection. At the time of ignition, the combustion is started in a mixture in which oxygen is insufficient. Upon combustion of the fuel injected by the main injection as well, heat generation just after ignition is suppressed so that production of NOx can be suppressed. The fuel injected by the main injection is ignited in the cool flame combustion zone by the pre-injection and passes through the cool flame combustion zone. The fuel is burned with oxygen supplied from the air existing around the combustion chamber 62 of the piston 60, so that production of soot can be prevented and output and fuel consumption can be improved. The main injection quantity of the fuel is set to the substantially stoichiometric air-fuel ratio by being mixed with the air in the cylinder, so that the engine output can be sufficiently assured.

Further, the ECU 9 limits the zone in which the fuel injection is executed by the pre-injection and the main injection to the cases where the loads of the diesel engine are medium and heavy. At light load, only the main injection is executed. Consequently, a problem such that misfire occurs or HC increases due to an insufficient fuel injection quantity per fuel injection can be prevented in the whole operating zone of the diesel engine.

(SECOND EMBODIMENT)

Figure 13:
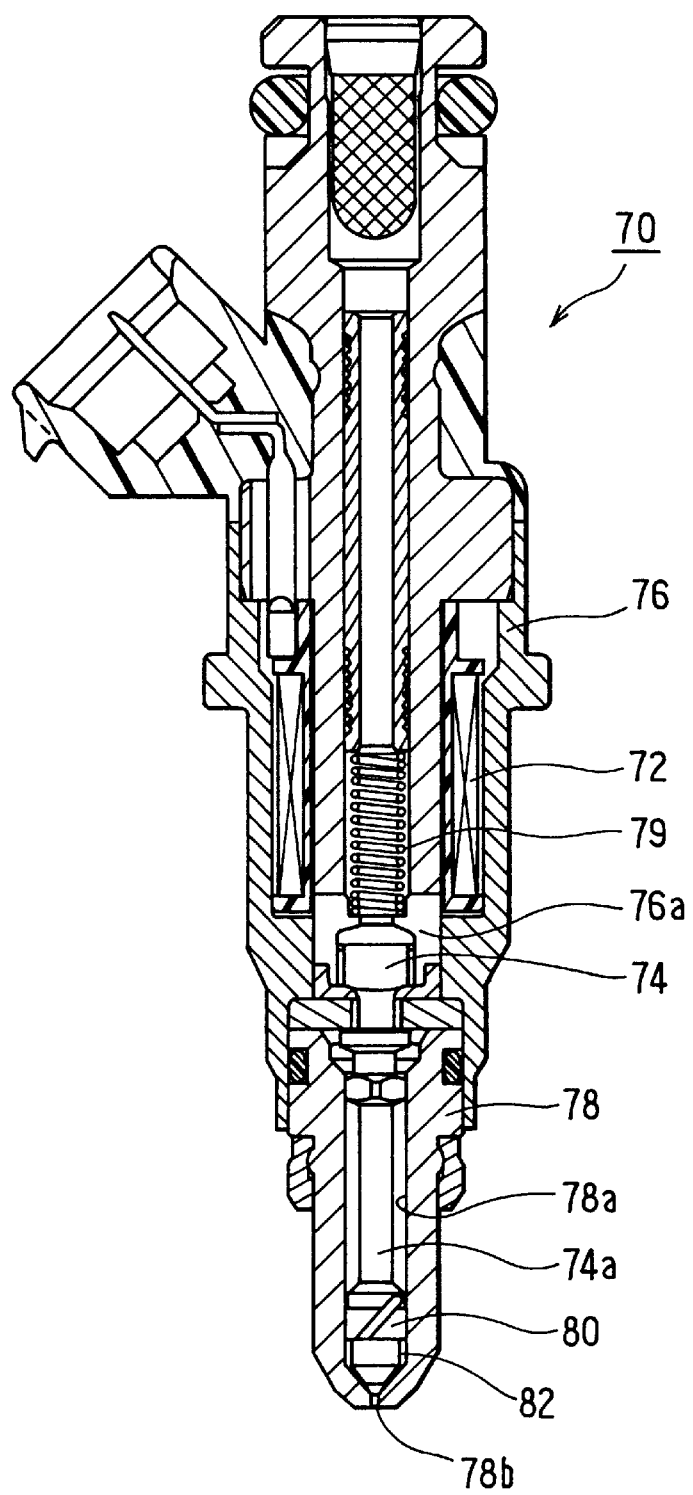
FIG. 13 is a cross sectional view of a fuel injector used in a second embodiment of the present invention.

In this embodiment, as shown in FIG. 13, an injector 70 for directly moving a needle 74 by a magnetic force generated by a solenoid 72 by the supply of current is used in place of the fuel injector 3 of the first embodiment.

That is, in the injector 70, the needle 74 opens or closes the opening part extending from a fuel chamber 76a on an injector body 76 side formed around the needle 74 to fuel path 78a on a nozzle body 78 side, thereby enabling the flow of the high pressure fuel supplied from a common rail (not shown) via the fuel chamber 76a to the fuel path 78a on the nozzle body side 78 to be adjusted. The needle 74 is mounted in the opening part of the fuel path 78a by the biasing force of a coil-shaped spring 79 built in the injector body 76 to check the flow of the fuel to the fuel path 78a. When the current is supplied to the solenoid 72 provided thereabout, the needle 74 is moved in the direction of freeing the opening part of the fuel path 78a by the magnetic force generated by the solenoid 72 in accordance with the amount of the supply of the current. A rod 74a projected from the needle 74 is housed in the fuel path 78a of the nozzle body 78 and a guide part 80 constructed in a manner similar to the first embodiment is provided at the tip of the rod 74a.

Figure 14:
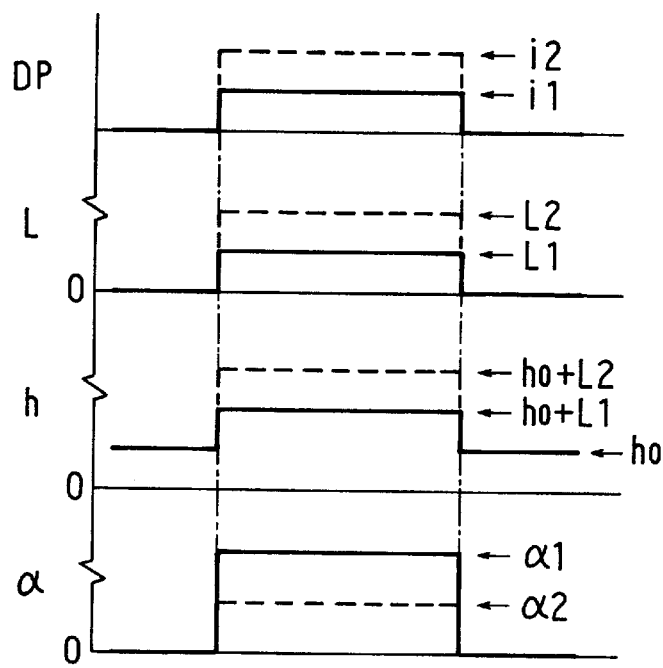
FIG. 14 is a timing diagram showing the operation of the fuel injector shown in FIG. 13.

According to the injector 70 shown in FIG. 13, therefore, as shown in FIG. 14, the needle lift amount (and moreover the height of a swirl chamber 82 formed by the guide part 80) is adjusted by a driving pulse current supplied to the solenoid 72 and the angle $\alpha$ of spray of the fuel injected from a nozzle hole 78b of the nozzle body 78 can be accordingly changed.

In case of executing a control similar to that of the first embodiment by using the injector 70, at the time of the pre-injection, the driving current supplied to the solenoid 72 is set to a current value i1 at which the needle lift amount L becomes (L1), the height (h) of the swirl chamber 82 becomes (ho+L1), and the angle $\alpha$ of spray becomes a wider angle $\alpha$1 of spray. At the time of the main injection, the driving current supplied to the solenoid 72 is set to a current value i2 at which the needle lift amount becomes L2, the height (h) of the swirl chamber 82 becomes (ho+L2), and the angle $\alpha$ of spray becomes the narrower angle $\alpha$2 of spray.

According to the injector 70, by changing the driving current (i) supplied to the solenoid 72, the height (h) of the swirl chamber 82 and further the angle a of spray can be continuously controlled. The angles a of spray at the times of the pre-injection and the main injection can be therefore controlled according to the operating conditions of the engine and the combustion characteristics of the fuel spray can be set optimally.

Figure 15:
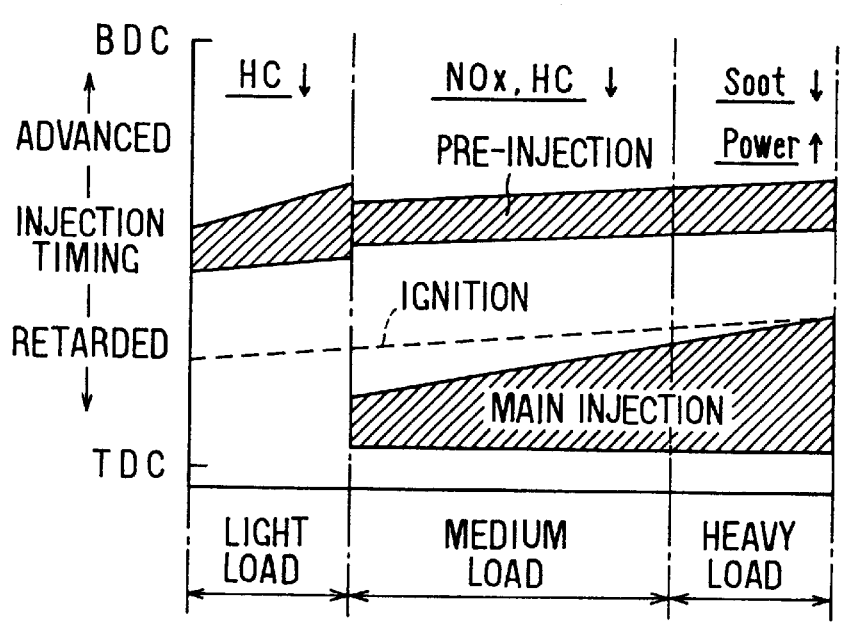
FIG. 15 is a diagram showing another execution pattern of the pre-injection and the main injection according to engine loads.

Although the pre-injection is inhibited and only the main injection is performed when the engine load is low, thereby preventing a problem such as misfire or increase in HC from occurring at light load of the engine, as shown in FIG. 15, it is also possible to perform only the pre-injection and inhibit the main injection when the engine load is low.

Although the foregoing embodiments have been described with respect to the fuel injection system for supplying the fuel to the diesel engine, it will be obviously understood that the invention can be also applied to fuel injection system of a direct injection type gasoline engine for directly injecting the fuel into the cylinder of a gasoline engine.

Although each of the pre-injection and the main injection is realized by one fuel injection in the foregoing embodiments, each of the pre-injection and the main injection can be also realized by a plurality of fuel injections. That is, the invention can be applied as long as the fuel spray is stratified by the pre-injection and ignited, the fuel spray injected by the main injection is ignited in the stratified combustion zone and perfectly burned with oxygen provided by un-used air in the cylinder. It is sufficient to properly set the number of fuel injection times with respect to each of the pre-injection and the main injection.

(THIRD EMBODIMENT)

In this embodiment another type of fuel injector is used in the similar system and controlled as in the first embodiment.

Figure 16:
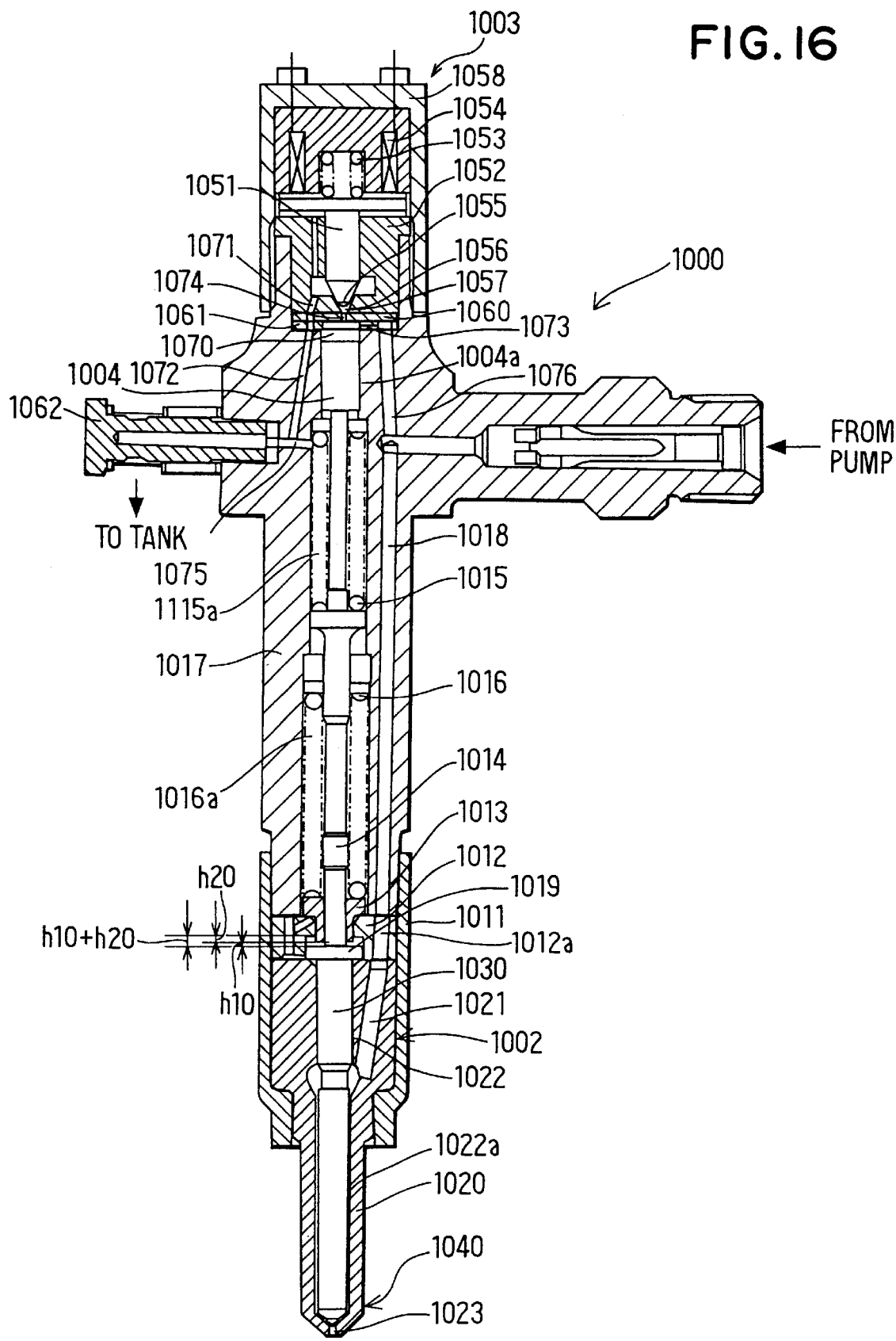
FIG. 16 is a cross-sectional view showing a fuel injector used in a fuel supply system according to a third embodiment of the invention.

This fuel injector 1000 is constructed as shown in FIG. 16 to be inserted in the head of an engine (not shown) and injects fuel into a combustion chamber formed between a cylinder of the engine and a piston which reciprocates in the cylinder. The fuel injector 1000 is driven by high pressure fuel from a pump (not shown) which is calculated and controlled by an ECU (not shown) in accordance with inputs of a rotational speed of the engine, a load and temperatures and pressures of fuel, an intake air, and a cooling water.

The fuel injector 1000 has a nozzle 1002 comprising a first spring 1015 which controls the needle lift, a second spring 1016, a control chamber 1070, and an injector 1040 which can change the angle of spray and open and close the nozzle hole.

The fuel injector 1001 has the construction such that the nozzle 1002 is joined to a holder 1017 via a chip packing 1012 by a retaining nut 1011. A needle 1030 is slidably fit in an inner part 1022 of a nozzle body 1020 of the nozzle 1002. The needle 1030 is pressed against the seat surface of the nozzle body 1020 by the first spring 1015 via a rod 1014 and a pressure pin 1019. The first spring 1015 is fit by insertion in a spring chamber 1015a formed in the holder 1017. An initial set load of the first spring 1015 is Fs1 and a spring constant is k1. The second spring 1016 is similarly fit by insertion in a spring chamber 1016a formed in the holder 1017 and presses a spring washer 1013 against the chip packing 1012. An initial set load of the second spring 1016 is Fs2 and a spring constant is k2. When the spring washer 1013 is mounted on the chip packing 1012, the lower end surface of the spring washer 1013 and the pressure pin 1019 define a clearance h10, that is, a first lift. In this instance, the lower end face of the spring washer 1013 is projected from the lower end face of the recessed face of the chip packing 1012 only by an amount of h20, that is, a second lift. The maximum lift of the needle 1030 is therefore h10+h20.

A control electromagnetic valve 1003 is also joined to the holder 1017 by a nut 1058. The control electromagnetic valve 1003 comprises a solenoid 1054, a control valve 1051, a body 1052, a plate 1060 having an outlet throttle 1074, a plate 1061 having an inlet throttle 1073, and a spring 1053 for pressing a seat 1055 of the control valve 1051 against a seat surface 1056 of the body 1052. The inlet throttle 1073 and the outlet throttle 1074 are open toward the control chamber 1070. A control piston 1004 is fit in the inner part 1004a of the holder 1017 by insertion and its lower part is in contact with the rod 1014. The top part of the control piston 1004 and the holder 1017 define the control chamber 1070. A cross-sectional area Act of the control piston 1004, which receives a fuel pressure of the control chamber 1070 is set to be smaller than a cross-sectional area Ag of a guide part of the needle 1030, that is, the inner part 1022 of the nozzle body 1020.

High pressure fuel supplied from a high pressure pump (not shown) is supplied to a nozzle hole 1023 via a high pressure channel 1018 in the holder 1017, a path 1012a in the chip packing 1012, and a path 1021 and an inner part 1022a in the nozzle body 1020. Similarly, the high pressure fuel passes through a path 1076 in the holder 1017, the inlet throttle 1073, the control chamber 1070, and the outlet throttle 1074. An opening 1057 of the body 1052 is opened by the control valve 1051, thereby connecting the outlet throttle 1074 to a fuel tank (not shown) via fuel passages 1071, 1072, and 1075 on a low pressure side and a hollow screw 1062. The passage 1075 is open also toward the spring chamber 1015a and discharges a low-pressure fuel in the spring chambers 1015a and 1016a to the tank.

Figure 19:
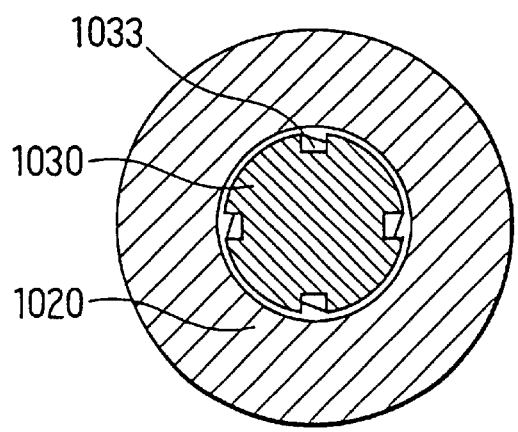
FIG. 19 is a cross-sectional view showing a state where a needle in FIG. 18 is lifted a little.
Figure 20:
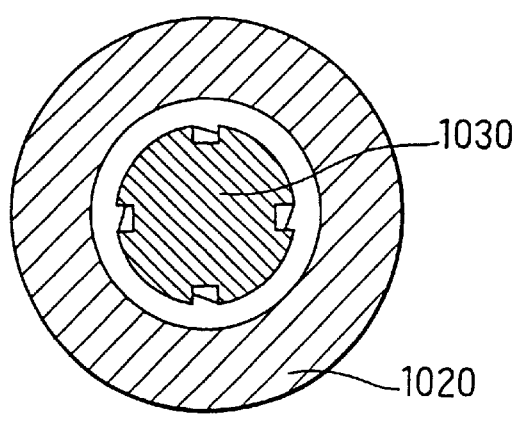
FIG. 20 is a cross-sectional view showing a state where the needle in FIG. 18 is lifted to a maximum.

The construction of the injector 1040 will now be described. The injector 1040 shown in FIGS. 18 to 20 has a swirl force generator 1031, a swirl chamber 1025, a seat 1035, and the nozzle hole 1023. The swirl force generator 1031 comprises a seat surface 1024 of the nozzle body 1020, conical surfaces 1032, 1036, and 1038 and a cylindrical surface 1037 formed on the surface of the needle 1030, and a plurality of oblique grooves 1033 and applies a swirl force in the circumferential direction of the needle 1030 to a passing fuel. The conical surface 1032 is formed at a conical angle which is the same as or slightly smaller than that of the seat surface 1024. The swirl force generator 1031 is not limited to the above construction. As the basic construction, as long as the conical surface formed in the nozzle body 1020 side such as the seat surface 1024 and the conical surface 1032 formed on the outer surface of the needle 1030 face each other and the oblique groove 1033 is formed in the conical surface 1024 or 1032, similar effects can be sufficiently obtained. This embodiment is not limited to the conical surfaces, but spherical surfaces may be also used.

The swirl chamber 1025 is defined by the seat surface 1024 on the nozzle body 1020 and the cylindrical surface 1034 and the conical surface 1038 which are at downstream of the swirl force generator 1031 of the needle 1030. The swirl chamber 1025 is not limited to the above shape. The cylindrical surface 1034 may be a conical surface, a composite surface of cylinder and cone, a spherical face, or the like.

The seat 1035 of the needle 1030 is closed by the first spring 1015, comes into contact with the seat surface 1024 of the nozzle body 1020, and is opened by being lifted up by the injection pressure against the first spring 1015. On the downstream side of the seat 1035, a passage is formed by the seat surface 1024 of the nozzle body 1020, a conical surface 1039 of the needle 1030 having a conical angle larger than that of the seat surface 1024, and a conical surface 1391 having a conical angle larger than that of the conical surface 1039. The conical surface of the nozzle body 1020 continuously changes from the seat surface 1024 to a seat surface 1241 and forms a passage which is communicated with the nozzle hole 1023. In this case, the conical surfaces 1039 and 1391 may be a single conical surface formed at the same angle. On the nozzle body 1020 side as well, the conical surface 1241 and the conical surface 1024 may be a single conical surface formed at the same angle. Further, the faces can have a curved surface such as a circular arc.

An upstream inlet of the oblique groove 1033 on the conical surface 1036 and the cylindrical surface 1037 is formed at a larger curvature radius Ra. The opposite side inlet is formed at a smaller curvature Rb. An outlet side is formed similarly to satisfy Ra'>Rb'.

The cross-sectional area Act of the control piston 1004 which receives fuel pressure, the cross-sectional area Ag of the inner part 1022 of the nozzle body 1020, and the cross-sectional area As of the seat 1035 of the needle 1030 are set so as to satisfy the following relation.

Act<Ag, or (Ag-AS)<Act<Ag

The operation of the fuel injector of the embodiment will now be described with reference to FIG. 17.

A predetermined injection pressure is generated by the high pressure pump and supplied to the fuel injector 1001. A control valve driving pulse DP according to the operating conditions of the engine is generated by the ECU and supplied to the control electromagnetic valve 1003. When an excitation suction force is generated by the supply of electric current to the solenoid 1054, the control valve 1051 is lifted up against the spring 1053 by an amount Lx. The control chamber 1070 is consequently communicated with the low pressure side via the opening 1057 and the outlet throttle 1074. The areas of the two throttles are set so that the area of the outlet throttle 1074 is larger than that of the inlet throttle 1073. The outgoing fuel quantity is therefore larger than the incoming fuel quantity and a pressure Pct in the control chamber 1070 starts to decrease. The pressure decreasing speed can be arbitrarily adjusted by setting of an area difference of the two throttles and the volume of the control chamber 1070.

When the pressure Pct becomes smaller than the force of lifting the needle 1030, the needle 1030 starts opening the valve. The force exerted on the needle 1030 will be described in the respective cases.

1. When the lift (h) of the needle 1030 is smaller than h10 (h<h10), the force exerted on the needle 1030 is as follows.
(i) when the needle closes the valve (h=0)

A valve closing force Fc1 is a sum of a fuel pressure force Fct applied to the control piston 1004 and the initial set load Fs1 of the first spring 1015.

$$Fc1 = Fct + Fs1 = Pct \times Act + Fs1$$

The valve opening force Fo is a fuel pressure force Fd applied to the needle 1030.

$$Fo = Fd = Pd \times (Ag - As)$$

A force F applied to the needle is therefore as follows.

$$F = Fo - Fc1 = Pd \times (Ag - As) - Pct \times Act + Fs1 \qquad (1)$$

(ii) when the needle closes the valve;

(0<h<h10)

A contraction of the first spring 1015 is added and the spring force Fs becomes;

$$Fs = Fs1 + k1 \times h$$

The valve closing force is accordingly as follows.

$$Fc1 = Fct + Fs = Fct + Fs1 + k1 \times h$$

The valve opening force is as follows.

$$Fo = Fd = Pd \times Ag$$

Thus, the force F applied to the needle is obtained by the following equation.

$$F = Fo - Fc1 = Pd \times Ag - Fct - Fs1 - k1 \times h \qquad (2)$$

2. when the lift (h) of the needle 1030 is equal to or larger than the first lift h10 (h10≦h)

An initial set load Fs2 and a contraction of the second spring 1016 are added and the spring force Fs becomes;

$$Fs = k1 \times h + Fs1 + k2 \times (h - h10) + Fs2$$

The valve closing force Fc1 is as follows.

$$Fc1 = Fct + Fs = Pct \times Act + k1 \times h + Fs1 + k2 \times (h - h10) + Fs2$$

The valve opening force Fo is as follows.

$$Fo = Fd = Pd \times Ag$$

Thus, the force F applied to the needle 1030 is obtained by the following equation.

$$F = Fo - Fc1 = Pd \times Ag - Pct \times Act - k1 \times h - Fs1 - k2 \times (h-h10) - Fs2 \quad (3)$$

When the pressure Pct in the control chamber 1070 is lowered, the pressure Pd supplied from the pump becomes larger than the force obtained by adding Pct and the initial set load of the first load 1015. The needle 1030 is lifted up against the first spring 1015 by the injection pressure and opens the valve. This is the case where the condition of the force exerted on the needle of expression (1) (F≧0) is satisfied.

Figure 17:
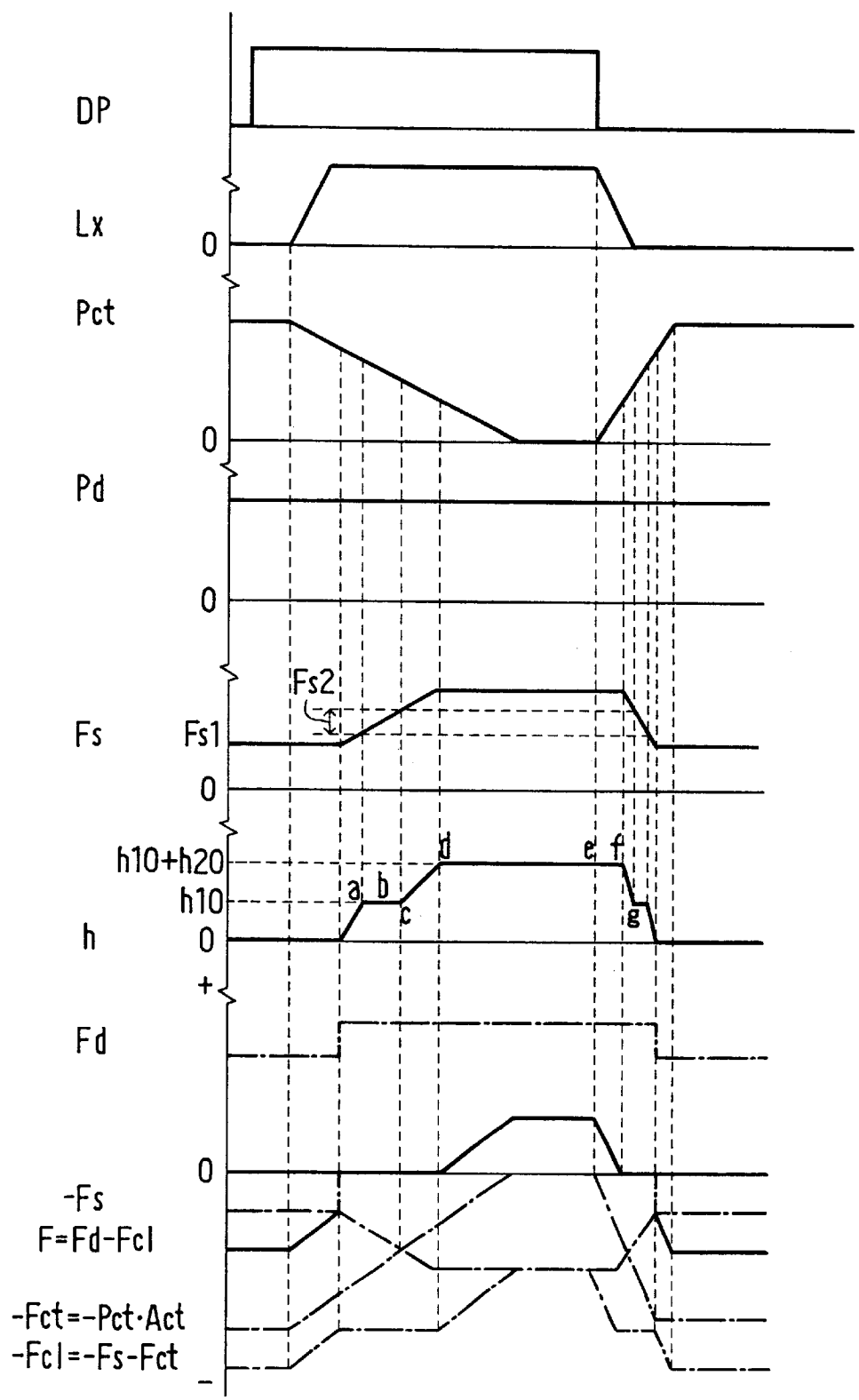
FIG. 17 is a timing diagram showing an operation of the fuel injector used in the third embodiment.

When the needle 1030 is lifted up to the first lift h10, the initial set load Fs2 of the second spring 1016 is applied at the lift h10 so that the needle 1030 stops lifting at h10 as shown by the point (a) in the needle lift of FIG. 17. Even when the fuel pressure of the control chamber 1070 further decreases, during a period in which F≧0 in the equation (2) and F<0 in the equation (3), the needle 1030 is stopped at the lift h10 as shown by the point (b) in FIG. 17.

When the fuel pressure of the control chamber 1070 decreases and F≧0 of the equation (3) is satisfied, the needle 1030 starts lifting again as shown by the point (c) in FIG. 17. The needle further rises only by the amount of h20 and the lift (h) becomes h10+h20, the needle 1030 is stopped at the maximum lift as shown by the point (d) in FIG. 17.

When the fuel pressure in the control chamber 1070 decreases, although the force of lifting the needle 1030 further increases, the needle 1030 does not rise any more. The load at this time is received by the chip packing 1012 as shown by the points (d) to (f).

When a predetermined driving pulse time has passed, the passage of a current to the solenoid 1054 is stopped, the control valve 1051 starts to be closed, and the fuel pressure in the control chamber 1070 starts increasing as shown by the point (e) in FIG. 17. When the force to push down the control piston 1040 increases further, the needle 1030 is started to be driven in the valve closing direction via the rod 1040 as shown by the point f in FIG. 17.

The load is not applied on the second spring 1016 when the needle 1030 is lowered only h20 (points g to h in FIG. 17).

The valve closing force applied on the needle 1030 becomes therefore only the fuel pressure in the control chamber 1070 and the biasing force Fs1 of the first spring 1015. The speed of the seat 1035 is reduced and then the seat 1035 is seated on the seat surface 1024. The impact force and noises upon mounting can be therefore reduced.

The needle 1030 can open and close the valve in stages by the setting of the areas of the two throttles 1073 and 1074 and by the function of the two springs 1015 and 1016. It can be set so that the period of the lift h10 is long at the valve opened time and the period is either eliminated or short at the valve closed time. Consequently, the fuel injection amount in the beginning of combustion is decreased, thereby enabling production of nitrogen oxides and noises in the event of combustion to be reduced. Further, by changing the rate of fuel injection at the end of injection in a short time, occurrence of soot can be suppressed.

The operation of the nozzle 1002 when the lifting of the needle 1030 is controlled as mentioned above will be described with reference to FIGS. 18, 21, and 22A to 22C.

Figure 18:
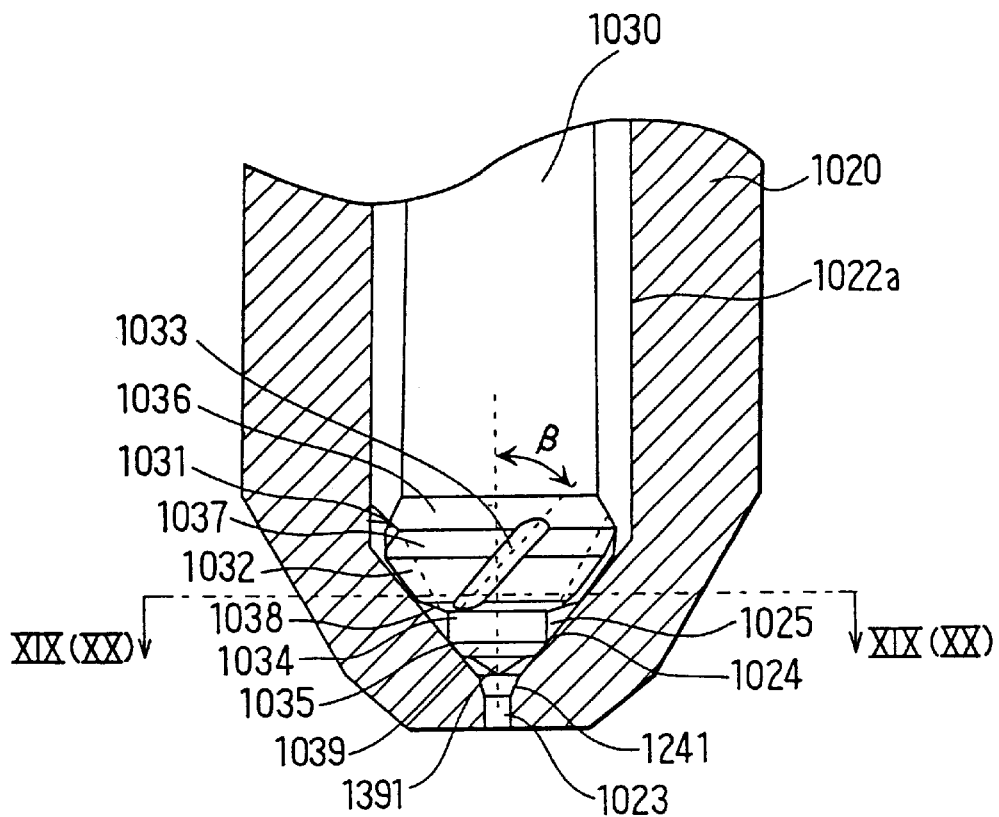
FIG. 18 is an enlarged view of the end of a nozzle of the fuel injector used in the third embodiment.
Figure 21:
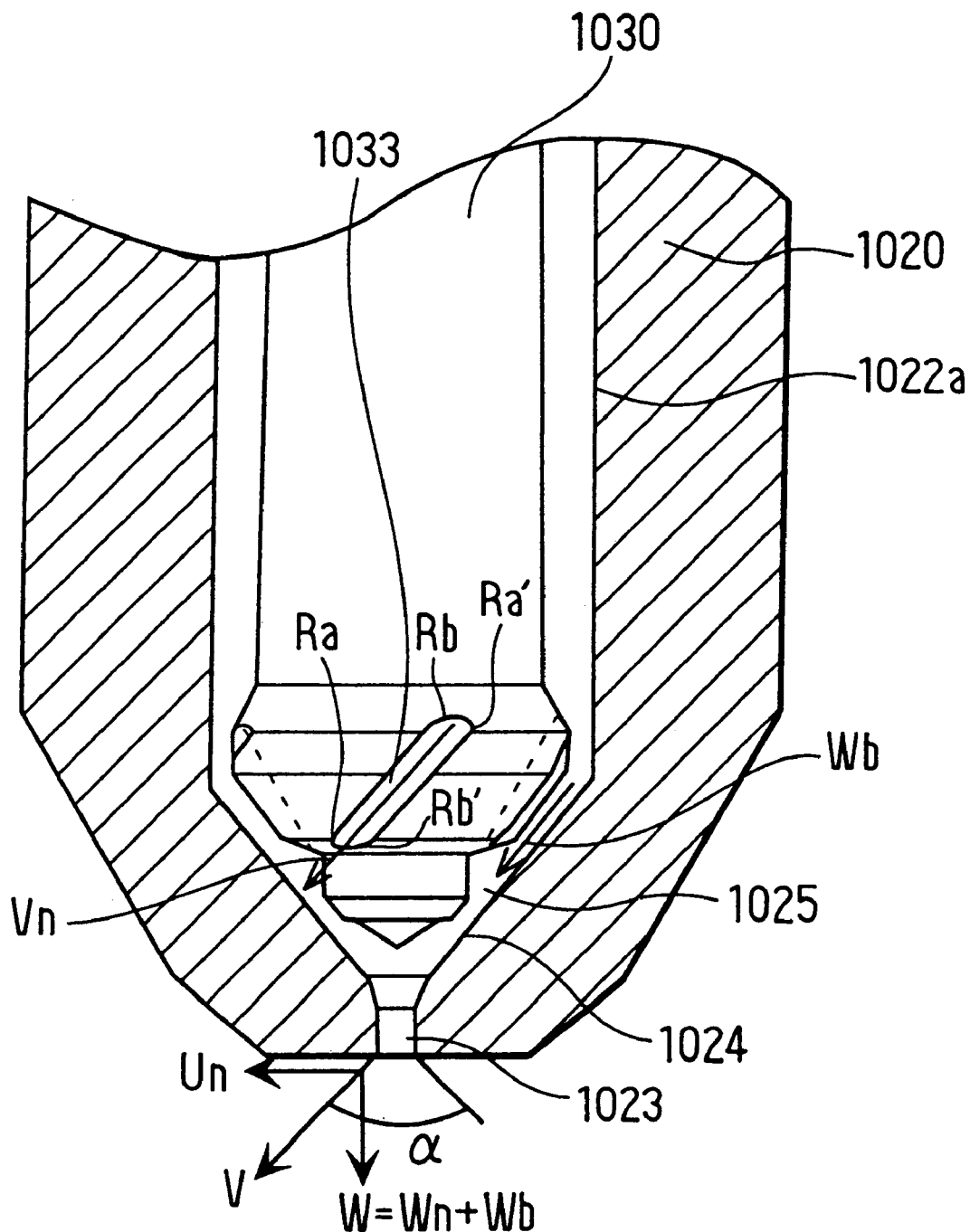
FIG. 21 is an enlarged view showing a state where the needle of the fuel injector used in the third embodiment is lifted.
Figure 22A:
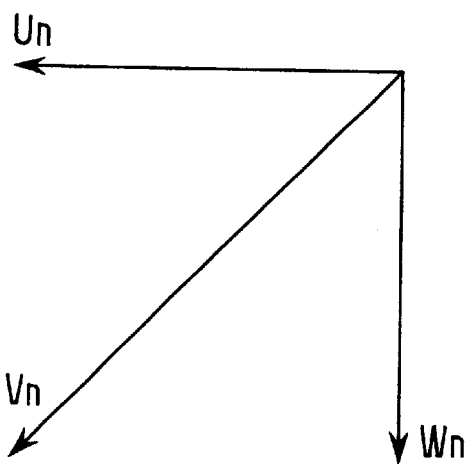
FIGS. 22A, 22B and 22C are a diagram showing the flow velocity of fuel flowing through an oblique groove of the fuel injector used in the third embodiment, a characteristic diagram showing the relation between the needle lift amount and the fuel flow velocity; and a characteristic diagram showing the relation between the needle lift amount and the angle of spray.

When the lift (h) of the needle 1030 is h10, as shown in FIG. 18, the conical surface 1032 of the needle 1030 and the seat surface 1024 form a very small clearance. In this instance, as shown in FIG. 21, there are the velocity Vn of fuel flowing through the oblique groove 1033 and the velocity Wb of fuel flowing between the conical surface 1032 and the seat surface 1024. The velocity vn has a circumferential velocity component Un and an axial velocity component Wn as shown in FIG. 22A.

Figure 22B:
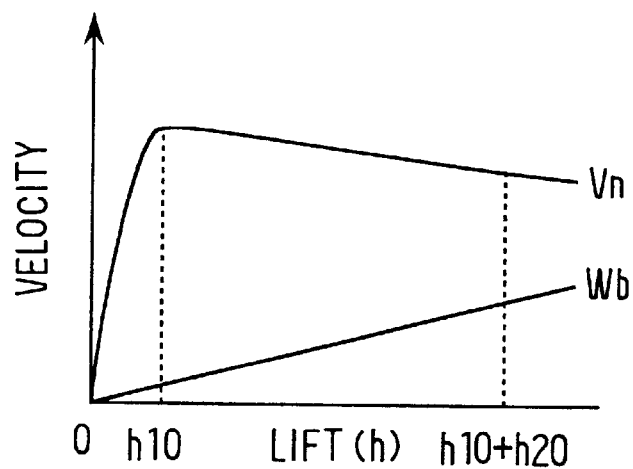

The ratio of the velocities Vn and Wb is almost determined by the ratio between their channel areas and changes as shown in FIG. 22B in response to the lifting of the needle 1030. Since the oblique groove 1033 has a predetermined channel cross-sectional area irrespective of the lifting of the needle 1030, the flow velocity in the oblique groove 1033 increases when the volume increases according to the area defined by the seat 1035 opened by the lifting and the seat surface 1024. When it is set so that the area of the opening of the seat 1035 is equal to the cross-sectional area of the oblique groove 1033 at around the first lift h10, the velocity vn reaches the highest velocity at the first lift.

On the other hand, although the fuel velocity Wb increases almost in proportion to the lift of the needle 1030, the value is small and the its increase is gentle at a few tenths of a millimeter of the actual nozzle lift amount. As compared with the increase in vn, therefore, the ratio of Vn and Wb becomes the maximum around at the first lift. In this instance, the angle of spray is determined by the ratio of the circumferential velocity component and the axial velocity component at the nozzle hole. The angle of spray is equal to the ratio of the circumferential velocity component Un and the axial velocity component W (=Wn+Wb) of the fuel flowing through the swirl chamber 1025 from the low of conservation of momentum and the free vortex. Thus, a fuel is injected from the nozzle hole 1023 at the angle α of spray obtained from the following equation.

$$\tan(\alpha/2) = Un/(Wn+Wb)$$

Figure 22C:
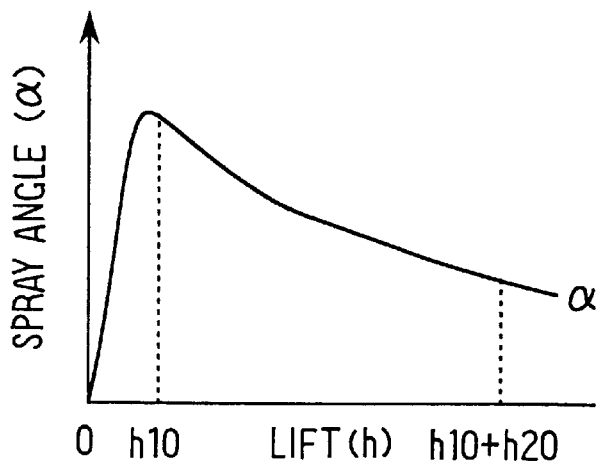

When the fuel pressure in the control chamber 1070 decreases, the needle 1030 is lifted up against the biasing forces of the first and second springs 1015 and 1056 up to the maximum lift h10+h20. In such a state, the area between the seat 1035 and the seat surface 1024 is enlarged, so that the axial flow velocity Wb increases, the velocity Vn in the oblique groove 1033 is disturbed by Wb and slightly decelerated. The angle α of spray is thus reduced as shown in FIG. 22C.

The volume can be decreased by reducing the diameter of the swirl chamber 1025, and a time delay can be reduced when the swirl force is generated. Further, since the swirl chamber 1025 is formed just above the seat 1035, a change in the angle of spray quickly follows the lift. Since the spray injected by the swirl injector is obtained by shearing and atomizing the fuel, the fuel can be more finely atomized at a lower injection pressure as compared with a hole nozzle and the like.

As described above, according to the third embodiment, the swirl valve and the needle lift are controlled stably in two phases in the nozzle and the swirl generating force is changed in accordance with the needle lift. The spray angle varying technique necessary for a future combustion concept can be therefore realized at low cost with a low injection pressure. Since the radii of curvature of the inlet and outlet of the oblique groove 1033 are set so that the inclined sides, that is, the flow-in side at the inlet and the downstream side of a swirl at the outlet are larger than the other sides, respectively, a loss of the flow is small and peeling does not easily occur, so that occurrence of cavitation can be prevented. That is, unnecessary increase in the pressure in the injection system is reduced, the mechanical efficiency can be improved, and the reliability of the nozzle can be improved.

At the valve closing start time, the valve closing velocity is high because of the loads of the first and second springs 1015 and 1016. When the lift becomes equal to or smaller than the first lift h10, however, the needle valve closing velocity just before the needle is seated is decreased by the fuel pressure of the control piston having the diameter smaller than that of the needle and the small initial set load of the first spring 1015, and the valve closing impact is lessened. From this point of view as well, the reliability of the nozzle can be improved. At a light load when the injection period only at the first lift is sufficient, the rate of injection of the nozzle can be suppressed. Consequently, a very small injection quantity can be stably controlled.

Further, by providing the swirl chamber 1025, even when the needle 1030 is deviated with respect to the seat 1035, it is aligned by the pressure balancing action in the swirl chamber 1025, so that the needle 1030 is maintained coaxially with the nozzle body 1020 and a deformation of the spray can be prevented.

(FOURTH EMBODIMENT)

Figure 23A:
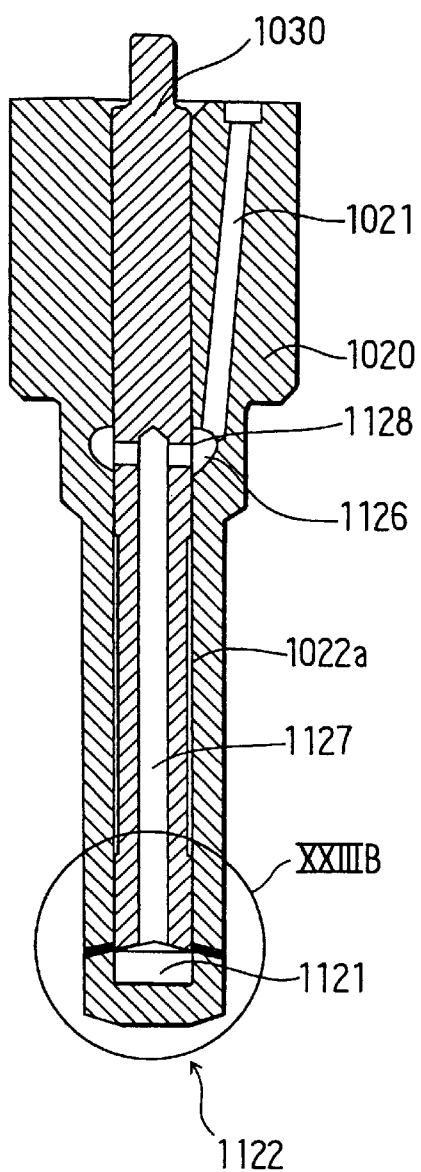
FIGS. 23A and 23B are cross-sectional views showing a nozzle of a fuel injector used in a fourth embodiment of the invention.
Figure 23B:
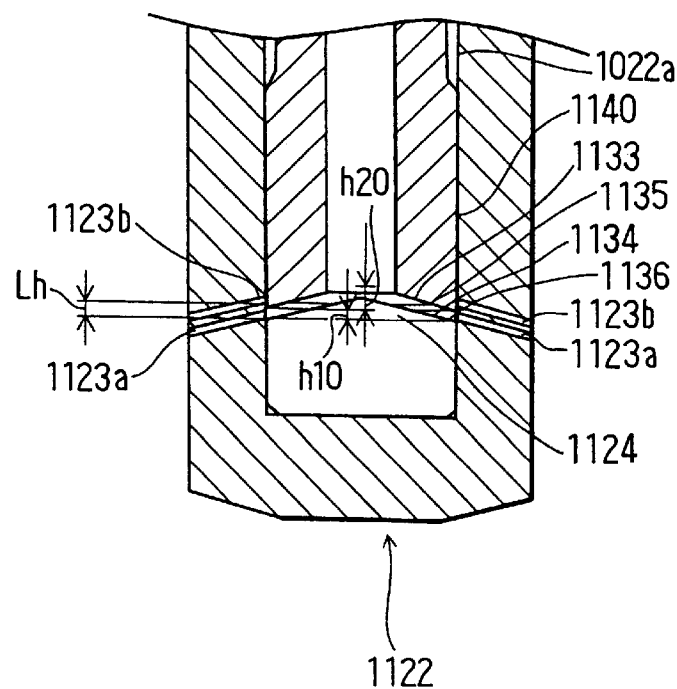

Although the swirl velocity direction is changed according to the distance between the swirl flow generator 1031 and the seat surface 1024 in the third embodiment, in the fourth embodiment shown in FIGS. 23A and 23B, a first nozzle hole group consisting of a plurality of nozzle holes 1123a and a second nozzle hole group consisting of a plurality of nozzle holes 1123b are provided in the radial direction of the nozzle body 1020 and the group of nozzles to be opened are changed according to the lift of the needle 1030, thereby changing the rate of injection and the spray conditions.

According to the fourth embodiment, in the needle 1030, fuel passages 1127 and 1128 are formed and the fuel passage 1121 in the nozzle body 1020 is communicated with the fuel passages 1127 and 1128 via a fuel chamber 1126. The tip 1122 of the needle 1030 is pressed against a seat member 1121 formed in the nozzle body 1020. At the tip 1122, conical surfaces 1133 and 1134 which are lined with the fuel passage 1127 are formed. The crossed lines of the conical faces 1133 and 1134 form a seat 1135 which comes into contact with a seat surface 1124 of the seat member 1121, and the communication between the fuel passage 1127 and the nozzle holes 1123a and 1123b is made.

An outer part 1140 of the tip of the needle 1130 is slidably fit into the inner part 1122a of the nozzle body 1020 by insertion. The crossed lines of the outer part 1140 and the conical surface 1134 define a nozzle hole opening control part 1136. A plurality of nozzle holes 1123a and 1123b are opened so as to obtain communication between with the inner part 1022a of the nozzle body 1020 and the outer part 1140 and construct the first and second nozzle hole groups. The nozzle holes 1123a and 1123b are opened so that the lower end faces have a difference of the axial distance Lh on the inner diameter sides. The distance Lh is larger than the first lift h1 of the needle 1030 and is smaller than the maximum lift h10+h20.

When the needle 1030 starts lifting by the driving of the control electromagnetic valve 1003, the seat 1135 is moved apart from the seat surface 1124 and the high pressure fuel is started to be injected via the first nozzle holes 1123a opened by the nozzle hole opening control part 1136. The needle 1030 further continues lifting and stops at the first lift h10. In this state, only the nozzle holes 1123a in the first nozzle hole group are opened by the opening control part 1136. As shown in FIGS. 23A and 23B, when the needle 1030 is further lifted and the lift becomes larger than the distance Lh between the lower ends of the nozzle holes 1123a and 1123b, the nozzle holes 1123b of the second nozzle group are opened and the fuel injection is started also via the nozzle holes 1123b. When the lift of the needle 1030 is the maximum lift h10+h20, the nozzle holes 1123a and 1123b are perfectly opened and the rate of injection becomes the maximum. The maximum lift (h10+h20) is set to be larger than Lh+ (the diameter of the second nozzle hole 1123b).

According to the construction, differently from the conical spray having a single wide angle in the third embodiment, a plurality of sprays having small angles injected via the nozzle hole groups are generated and a spray having a single conical angle as a whole spray group can be generated. The conical spray angles of the first and second nozzle hole groups may be different. The rate of injection is changed in two phases in accordance with the nozzle holes which are open. Further, by making the diameters of the first and second nozzle holes 1123a and 1123b different from each other, the rate of injection can be adjusted.

(FIFTH EMBODIMENT)

Figure 24:
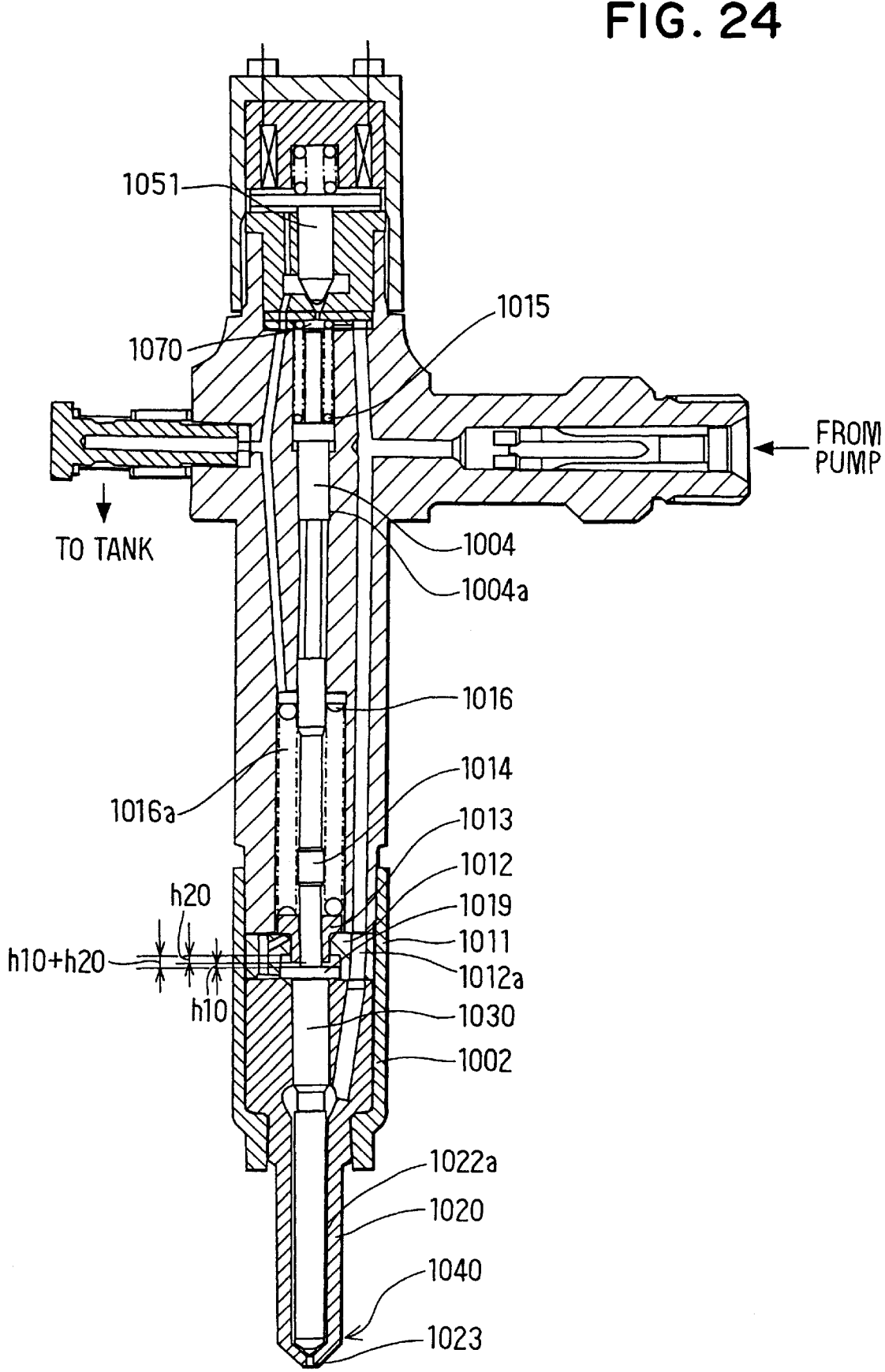
FIG. 24 is a cross-sectional view of a fuel injector used in a fifth embodiment of the invention.

This embodiment shown in FIG. 24 is differentiated from the third embodiment in that the first spring 1015 is housed in the control chamber 1070 on the control piston 1004. A fundamental operation is similar to that of the third embodiment. According to the construction, the total mass of the control piston 1004 and the rod 1014 can be reduced, the opening and closing response of the needle 1030 can be improved. Since the mass is small when the needle 1030 closes the valve, there is an effect that the impact force and noises when the needle 1030 is seated can be further reduced.

(SIXTH EMBODIMENT)

Figure 25:
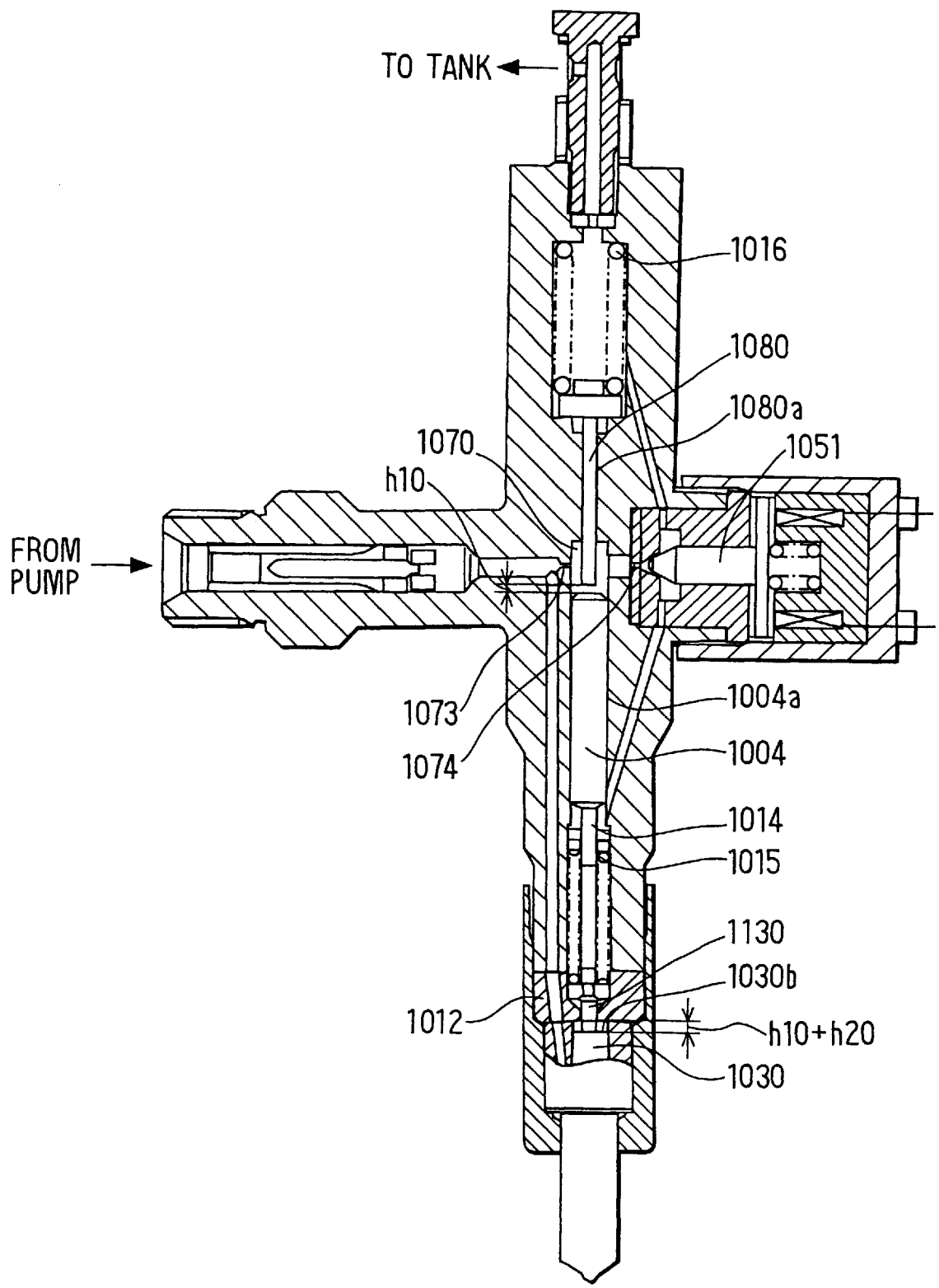
FIG. 25 is a cross-sectional view showing a fuel injector used in a sixth embodiment of the invention.

The sixth embodiment shown in FIG. 25 is differentiated from the third embodiment in that the first spring 1015 is moved downward so as to urge the needle 1030 via a pressure pin 1130 and the second spring 1016 is provided in a position upper than the control chamber 1070 so as to urge the needle 1030 by pressing the control piston 1004 via a rod 1080.

The control piston 1004 is pressed against the rod 1014. The control piston 1004 and the rod 1014 may be formed integrally. The clearance between the rods 1080 and 1014 defines to the first lift h10. The distance between the shoulder part 1030b of the needle 1030 and the lower end face of the chip packing 1012 specifies the maximum lift h10+h20. Fundamental operation is similar to those of the foregoing embodiments. According to the construction, the mass which changes integrally with the needle 1030 can be further reduced. That is, the rod 1080 is lifted at the lift h10 or lower when the needle 1030 closes the valve. By being apart from the needle 1030, the mass of the rod 1080 is made lighter than the mass at the valve closing time. The total length of the control piston 1004 and the rod 1014 can be shortened and the mass can be reduced. Thus, the valve closing impact of the needle 1030 and the noises can be further reduced.

(SEVENTH EMBODIMENT)

In this embodiment, a fuel injector shown in FIGS. 26 to 34A and 34B is used.

Figure 26:
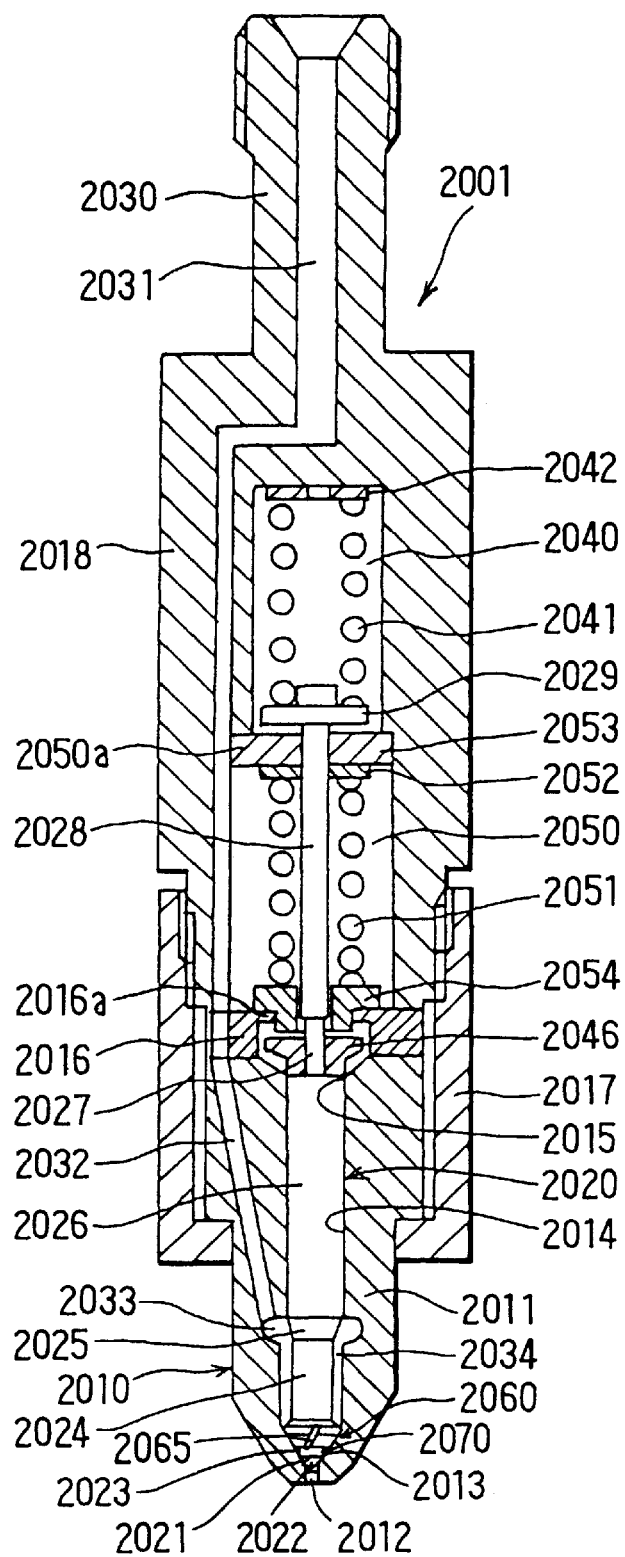
FIG. 26 is a cross-sectional view showing a fuel injector used in a fuel injection system according to a seventh embodiment of the invention.

A fuel injector 2001 shown in FIG. 26 is a type via which fuel is injected in stages into a combustion chamber of a diesel engine (not shown) and has a spray pattern forming member comprising a nozzle holder 2018, a retaining nut 2017, a distance piece 2016, and a fuel injection nozzle 2010. The nozzle holder 2018, the distance piece 2016, and the fuel injection nozzle 2010 are fixed to the fuel injector 2001 by the retaining nut 2017.

The nozzle holder 2018 has a fuel inlet 2030. In the nozzle holder 2018, a first spring housing chamber 2040 and a second spring housing chamber 2050 which are communicated with each other in the axial direction are formed. A fuel pipe (not shown) extended from a high pressure pump (not shown) is connected to the fuel inlet 2030 and a high pressure fuel is supplied from the high pressure pump into the fuel injection nozzle 2010. A fuel passage 2031 is formed in the fuel inlet 2030.

In the first spring housing chamber 2040, a first spring 2041, a spacer 2042, and a flange 2029 of a pressure pin 2028 are housed. The first spring 2041 has one end in contact with the flange 2029 and the other end in contact with the spacer 2042. The first spring 2041 biases a needle 2020 downward.

In the second spring chamber 2050, a second spring 2051, a spacer 2052, a spring cap 2053, and a spring washer 2054 are housed. One end of the second spring 2051 is in contact with the spring washer 2054 and the other end is in contact with the spacer 2052. Since the spacer 2052 is in contact with the spring cap 2053 and the spring cap 2053 is in contact with a step 2050a formed on the inner wall of the spring housing chamber 2050, the second spring 2051 biases the spring washer 2054 so as to press it against the distance piece 2016.

The distance piece 2016 has a small diameter part 2016a and has therein a spacer 2046. The maximum lift amount of the needle 2020 is regulated by the distance between the spacer 2046 and the small diameter part 2016a. An initial lift amount is regulated by the distance between the spacer 2046 and the spring washer 2054.

The fuel injection nozzle 2010 is provided on the nozzle hole side of the fuel injector 2001. The fuel injection nozzle 2010 is comprised of a nozzle body 2011 and the needle 2020 housed so as to reciprocate in the axial direction in the nozzle body 2011.

The nozzle body 2011 has a bottomed hollow cylinder shape. In the nozzle body 2011, a guide hole 2014, a valve seat member 2013, a nozzle hole 2012, a fuel passage 2034, a fuel chamber 2033, and a fuel supply passage hole 2032 are formed.

The guide hole 2014 axially extends in the nozzle body 2011 and whose one end is connected to an opening end 2015 of the nozzle body 2011 and the other end is connected to the fuel chamber 2033. The inner wall of the guide hole 2014 is formed with substantially the same inside diameter from the opening end 2015 of the nozzle body 2011 to a position near the fuel chamber 2033.

Figure 27:
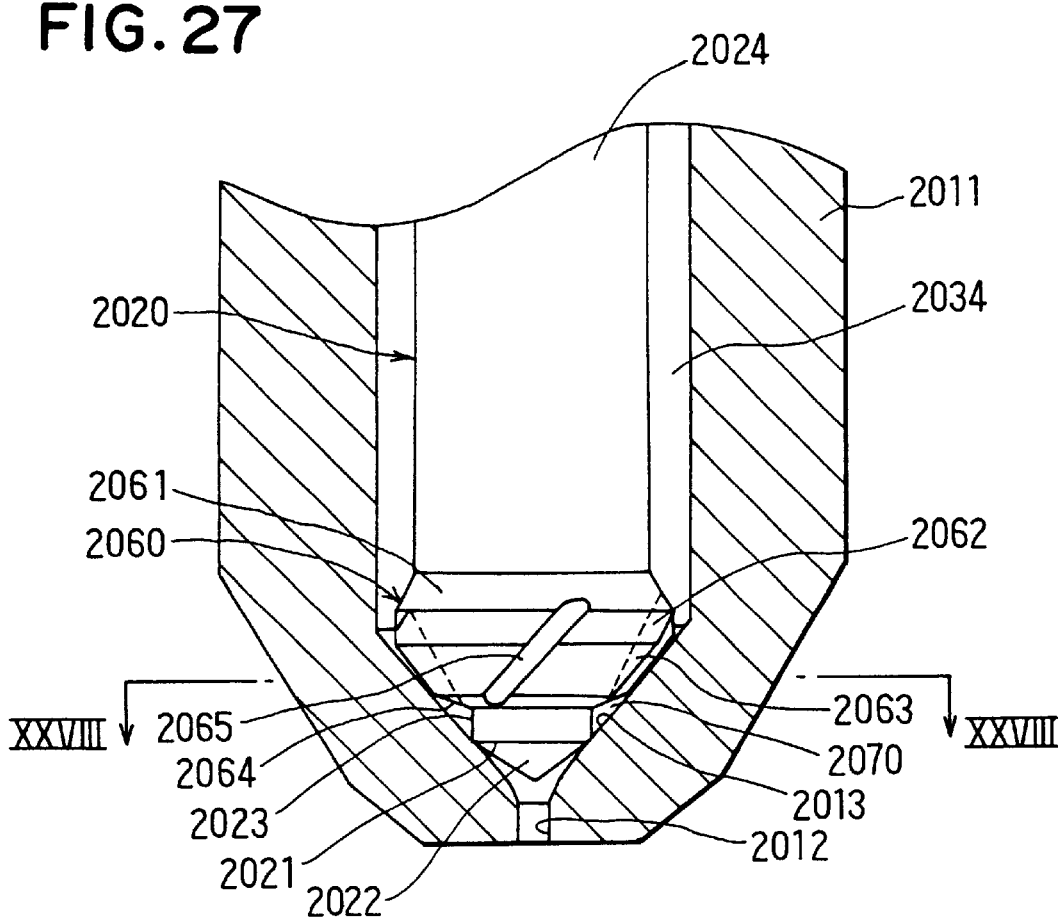
FIG. 27 is an enlarged view showing the fuel injector shown in FIG. 26.

As shown in FIG. 27, the valve seat member 2013 has a truncated conical surface. One end on the large diameter side extends to the fuel passage 2034 and the other end on the small diameter side is in contact with the nozzle hole 2012. A contact part 2021, which will be described hereinlater, of the needle 2020 can come into contact with the seat valve member 2013. The nozzle hole 2012 is formed at the tip of the nozzle body 2011, as a passage communicating the inside and outside of the nozzle body 2011. The inlet of the nozzle hole 2012 is open to the seat valve member 2013.

As shown in FIG. 27, the fuel passage 2034 extends axially in the nozzle body 2011, its one end is connected to the valve seat member 2013 and the other end is connected to the fuel chamber 2033. The fuel chamber 2033 is annularly formed on the inner wall connecting the guide hole 2014 and the fuel passage hole 2034. The fuel supply passage hole 2032 for supplying a fuel from the outside is connected to the fuel chamber 2033.

The needle 2020 has a solid cylindrical shape and comprises a neck 2027, a sliding part 2026, a truncated conical part 2025, a large diameter part 2024, a first swirl generating part 2060, a small diameter part 2023, and a conical part 2022.

The neck 2027 is formed at the end opposite to the nozzle hole side of the needle 2020 and whose outside diameter is slightly smaller than the inside diameter of the spacer 2046.

The sliding part 2026 has a constant outside diameter, is loosely fit into the guide hole 2014 with a clearance and can reciprocate in the axial direction. The sliding part 2026 has one end connected to the neck 2027 and the other end connected to the truncated conical part 2025. One end on the large diameter side of the truncated conical part 2025 is connected to the sliding part 2026 and the other end on the small diameter side is connected to the large diameter part 2024. The large diameter part 2024 has one end connected to the truncated conical part 2025 and the other end connected to a first truncated conical part 2061 of the first swirl generating part 2060.

The first swirl generating part 2060 comprises the first truncated conical part 2061, a cylindrical part 2062, a second truncated conical part 2063, and a third truncated conical part 2064. One end on the small diameter side of the first truncated conical part 2061 is connected to the large diameter side 2024, and the other end on the large diameter side is connected to the cylindrical part 2062. The cylindrical part 2062 has one end connected to the first truncated conical part 2061 and the other end connected to the second truncated conical part 2063. One end on the large diameter side of the second truncated conical part 2063 is connected to the cylindrical part 2062 and the other end on the small diameter side is connected to the third truncated conical part 2064. One end on the large diameter side of the third truncated conical part 2064 is connected to the second truncated conical part 2063 and the other end on the small diameter side is connected to the small diameter part 2023.

Figure 28:
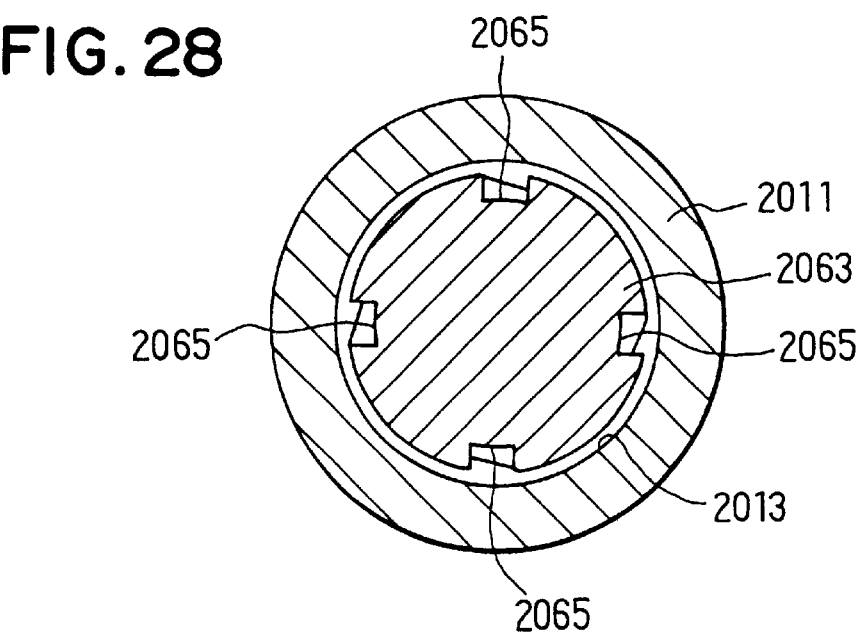
FIG. 28 is a cross-sectional view of the fuel injector taken along line XXVIII—XXVIII in FIG. 27.

On the outer walls of the cylindrical part 2062 and the second truncated conical part 2063, a first swirl groove 2065 as a first fuel inlet passage is formed. As illustrated in FIGS. 27 and 28, the first swirl grooves 2065 are formed in four positions from one end of the cylindrical part 2062 to the other end of the second truncated conical part 2063 so as to be inclined from the axis of the needle 2020. The outer surface of the second truncated conical part 2063 is formed at a slightly smaller angle or the same conical angle as that of the inner surface of the nozzle body 2011 in which the valve seat member 2013 is formed. That is, the outer surface of the second truncated conical part 2063 faces the inner surface of the nozzle body 2011 in which the valve seat member 2013 is formed.

Figure 29:
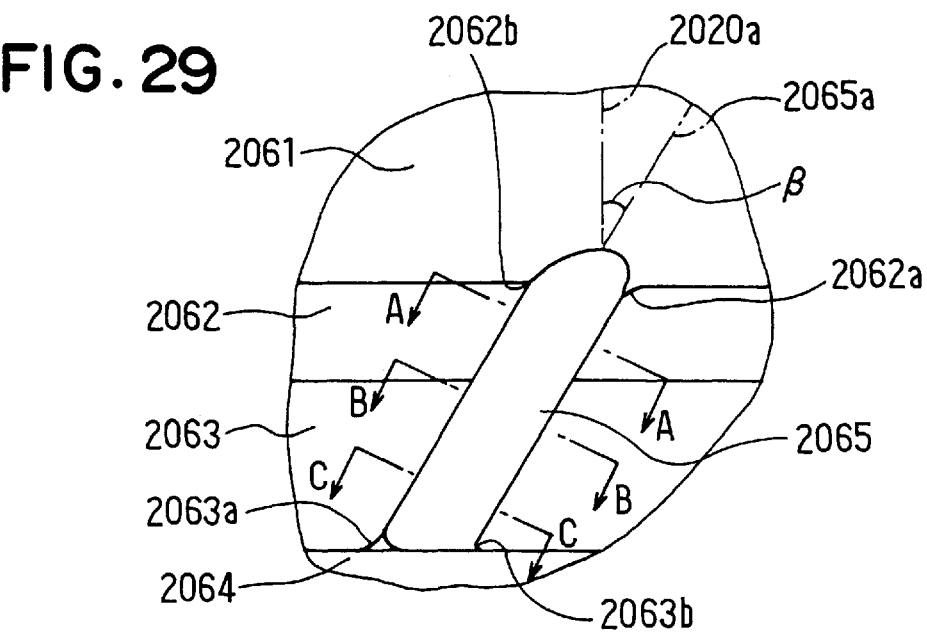
FIG. 29 is an enlarged view showing a first swirl groove of the fuel injector shown in FIG. 26.
Figure 30A:
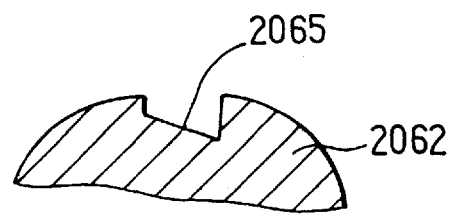
FIGS. 30A to 30C are cross-sectional views showing the first swirl groove shown in FIG. 29.
Figure 30B:
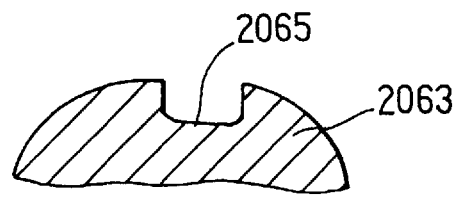
Figure 30C:
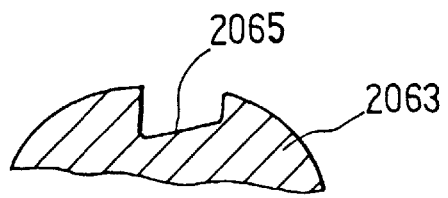

As illustrated in FIG. 29, the center axis 2065a of a first swirl groove 2065 is inclined a predetermined angle β from the axis 2020a of the needle 2020. One, 2062a, of inlet parts of the first swirl groove 2065 is formed at a radius of curvature larger than that of the other inlet part 2062b. One, 2063a, of outlet parts of the first swirl groove 2065 is formed at a radius of curvature larger than that of the other outlet part 2063b. As shown in FIGS. 30A, 30B, and 30C, the cross-sectional shape of the first swirl groove 2065 is rectangular and changes from the inlet to the outlet. Consequently, a fuel easily flows in the first swirl groove 2065 and easily flows out from the first swirl 2065. The first swirl groove 2065 has, therefore, a shape which easily receives the swirl force.

As shown in FIG. 27, the small diameter part 2023 has one end connected to the third truncated conical part 2064 and the other end connected to the conical part 2022 via the contact part 2021. The part connecting the small diameter part 2023 and the conical part 2022 is circular. This circular part is the contact part 2021 which comes into contact with the valve seat member 2013 when the valve is closed. When the valve is closed, the contact part 2021 seats on the valve seat member 2013, thereby interrupting fuel injection from the nozzle hole.

A first swirl chamber 2070 as a first swirl generating chamber is formed by the inner wall of the valve seat member 2013 of the nozzle body 2011, the outer wall of the third truncated conical part 2064 of the first swirl generating part 2060, and the outer wall of the small diameter part 2023 of the needle 2020. The first swirl chamber 2070 is communicated with the fuel supply passage 2034 via the first swirl groove 2065. The diameter of the first swirl chamber 2070 in the nozzle body 2011 forming a part is smaller than the outside diameter of the cylindrical part 2062 and the second truncated conical part 2063 of the first swirl generating part 2060 in which the first swirl grooves 2065 are formed.

The operation of the fuel injector 2001 having the above construction will now be described.

(1) A fuel of a predetermined quantity is force fed pressure from a high pressure pump at a predetermined timing and the high pressure fuel is supplied via a fuel pipe to the fuel inlet 2030. The high pressure fuel passes through the fuel passage 2031, the fuel supply passage hole 2032, and the fuel chamber 2033 and is stored in the fuel passage hole 2034, the first swirl groove 2065 and the swirl chamber 2070. The fuel pressure in the fuel passage hole 2034, the first swirl groove 2065 and the swirl chamber 2070 increases and reaches a pressure which overcomes the biasing force of the first spring 2041, the needle 2020 is lifted upward in FIGS. 26 and 27, the contact part 2021 is apart from the valve seat member 2013, and the valve is opened. A swirl is generated in the swirl chamber 2070 and the swirled fuel passes through an opening between the valve seat member 2013 and the contact part 2021, and is injected via the nozzle hole 2012.

(2) When the fuel pressure in the fuel passage hole 2034, the first swirl groove 2065, and the swirl chamber 2070 further increases, the lift amount of the needle 2020 increases and the spacer 2046 comes into contact with the spring washer 2054. This state corresponding to an initial lift state of the needle 2020. When the fuel pressure in the fuel passage hole 2034, the first swirl groove 2065, and the swirl chamber 2070 reaches a pressure which overcomes the resultant of biasing forces of the first and second springs 2041 and 2051, the spacer 2046 comes into contact with the small diameter part 2016a of the distance piece 2016 and the needle 2020 reaches a full lift state.

(3) Near the end of force feed of the high pressure pump, the fuel pressure in the fuel passage hole 2034, the first swirl groove 2065 and the swirl chamber 2070 decreases, and the needle 2020 is moved downward in FIG. 30 by the biasing forces of the first and second springs 2041 and 2051. The contact part 2021 seats on the valve seat member 2013, and the fuel injection is finished.

The velocity of the fuel flowing through the first swirl groove 2065 is set to Vn and the velocity of the fuel flowing through the clearance between the outer surface of the second truncated conical part 2063 and the inner surface of the valve seat member 2013 in the nozzle body 2011 is set to Wb. The relation among the lift amount of the needle 2020, the velocities Vn and Wb, and the angle of spray will be described with reference to FIGS. 31 to 34A and 34B.

Figure 33:
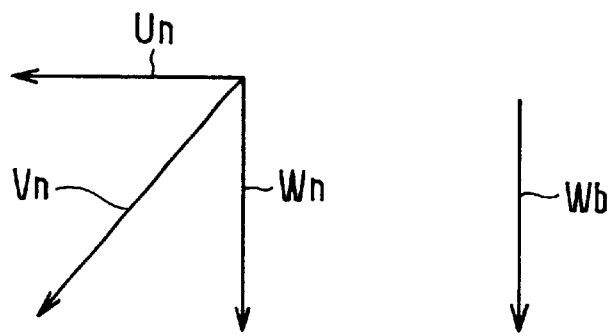
FIG. 33 is a diagram showing velocity vectors of fuel in the fuel injector according to the seventh embodiment.
Figure 34A:
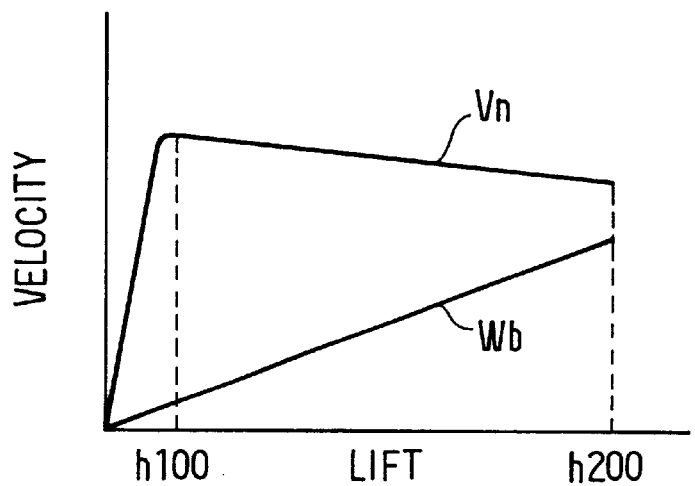
FIGS. 34A and 34B are characteristic diagram showing the relation between a needle lift of the fuel injector and fuel velocity, and the relation between the needle lift and the angle of spray.

As shown in FIG. 33, the velocity Vn has a circumferential velocity component Un and an axial velocity component Wn. In the initial lift state, as shown in FIG. 28, the clearance between the outer surface of the third truncated conical part 2063 and the inner surface of the valve seat member 2013 in the nozzle body 2011 is relatively small. The velocities Vn and Wb are determined according to respective channel areas and change as shown in FIG. 34A in response to the lift amount of the needle 2020. Specifically, since the first swirl groove 2065 has a fixed channel cross-sectional area irrespective of the lift amount of the needle 2020, the flow rate of the fuel increases as the opening area defined by the contact part 2021 and the valve seat member 2013 is enlarged by the lifting of the needle 2020 and the velocity Vn increases in the initial lift state. When it is set in the initial lift state that the opening area defined by the contact part 2021 and the valve seat member 2013 is almost equal to the cross sectional area of the first swirl groove 2065, the velocity Vn becomes the maximum in the initial lift state. On the other hand, the velocity Wb increases almost in proportion to the lift amount (h) of the needle 2020. Near the initial lift state, therefore, the ratio between the velocities Vn and wb becomes the maximum. In this instance, the angle of spray is determined by the ratio between the circumferential velocity component and the axial velocity component in the nozzle hole 2012 and becomes equal to the ratio between the circumferential velocity component Un and the axial velocity component W of the fuel flowing into the swirl chamber 2070 by the law of conservation of momentum and the free vortex. The axial velocity component W is defined as follows.

$$W = Wn + Wb$$

That is, the fuel is injected at the angle a of spray obtained as follows.

$$\tan(\alpha/2) = Un/(Wn+Wb)$$

In the initial lift state where the lift amount (h) of the needle 2020 is equal to h100, the relatively large angle $\alpha$ of spray can be obtained and the penetration of the fuel spray is relatively short.

Figure 31:
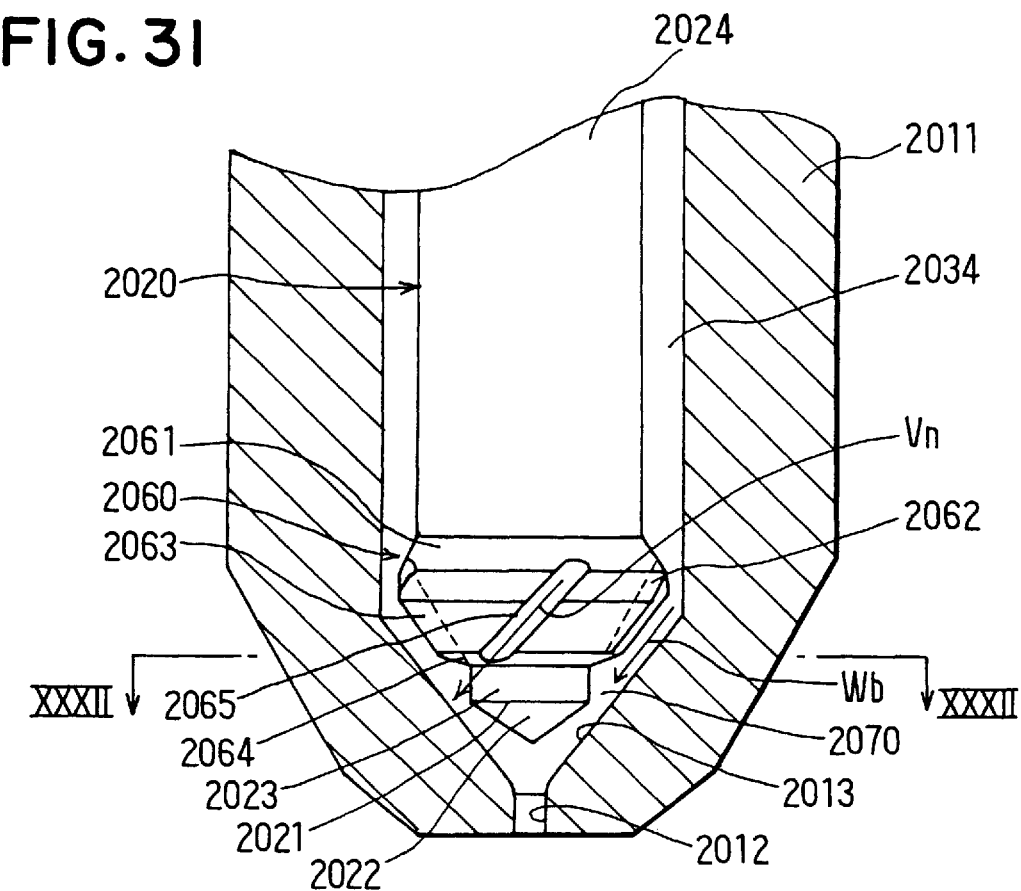
FIG. 31 is an enlarged cross-sectional view showing a full lift state of the fuel injector shown in FIG. 26.
Figure 32:
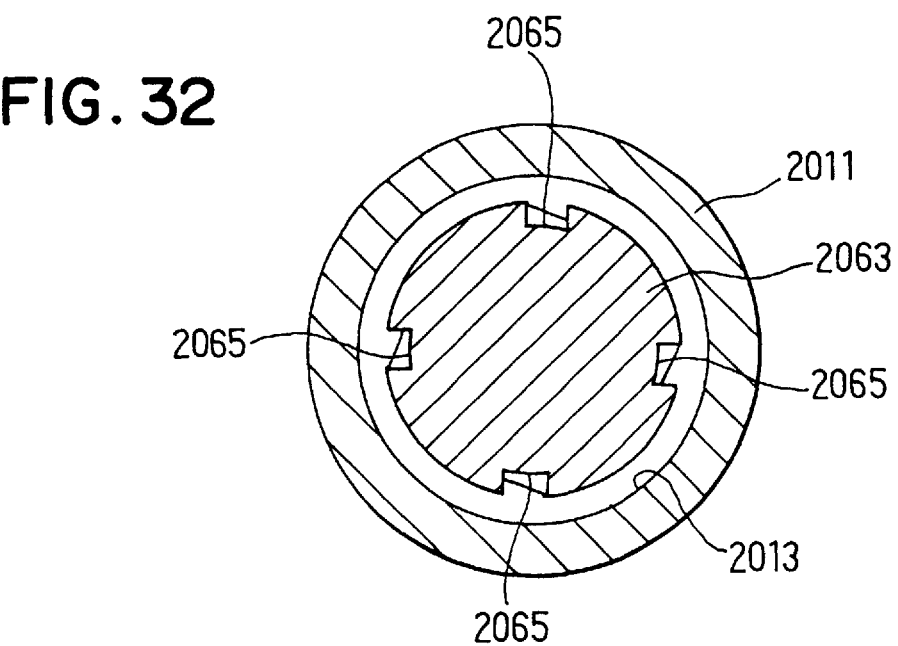
FIG. 32 is a cross-sectional view showing the fuel injector taken along line XXXII—XXXII in FIG. 31.
Figure 34B:
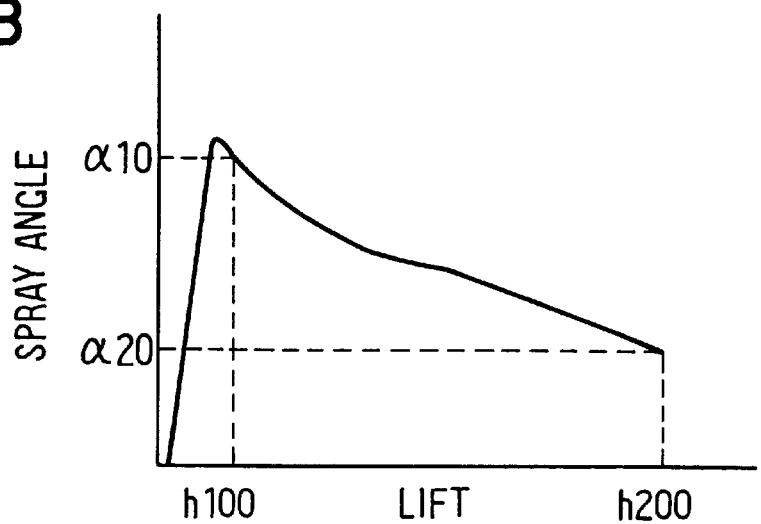

In the full lift state where the lift amount (h) of the needle 2020 becomes h200, as illustrated in FIGS. 31 and 32, the clearance between the outer surface of the third truncated conical part 2063 and the inner surface of the valve seat member 2013 of the nozzle body 2011 is relatively large. In the full lift state, as the opening area between the contact part 2021 and the valve seat member 2013 increases, the velocity Wb increases and the velocity vn slightly decreases by being disturbed by the fuel having the velocity wb. As a result, the angle $\alpha 20$ of spray in the full lift state becomes smaller as compared with that in the initial lift state as shown in FIG. 34B, and a relatively long penetration of the fuel spray can be obtained.

A comparative example having a swirl generating part whose construction is different from that of the swirl generating part 2060 shown in FIG. 27 will be described with reference to FIGS. 39, 40A and 40B.

Figure 39:
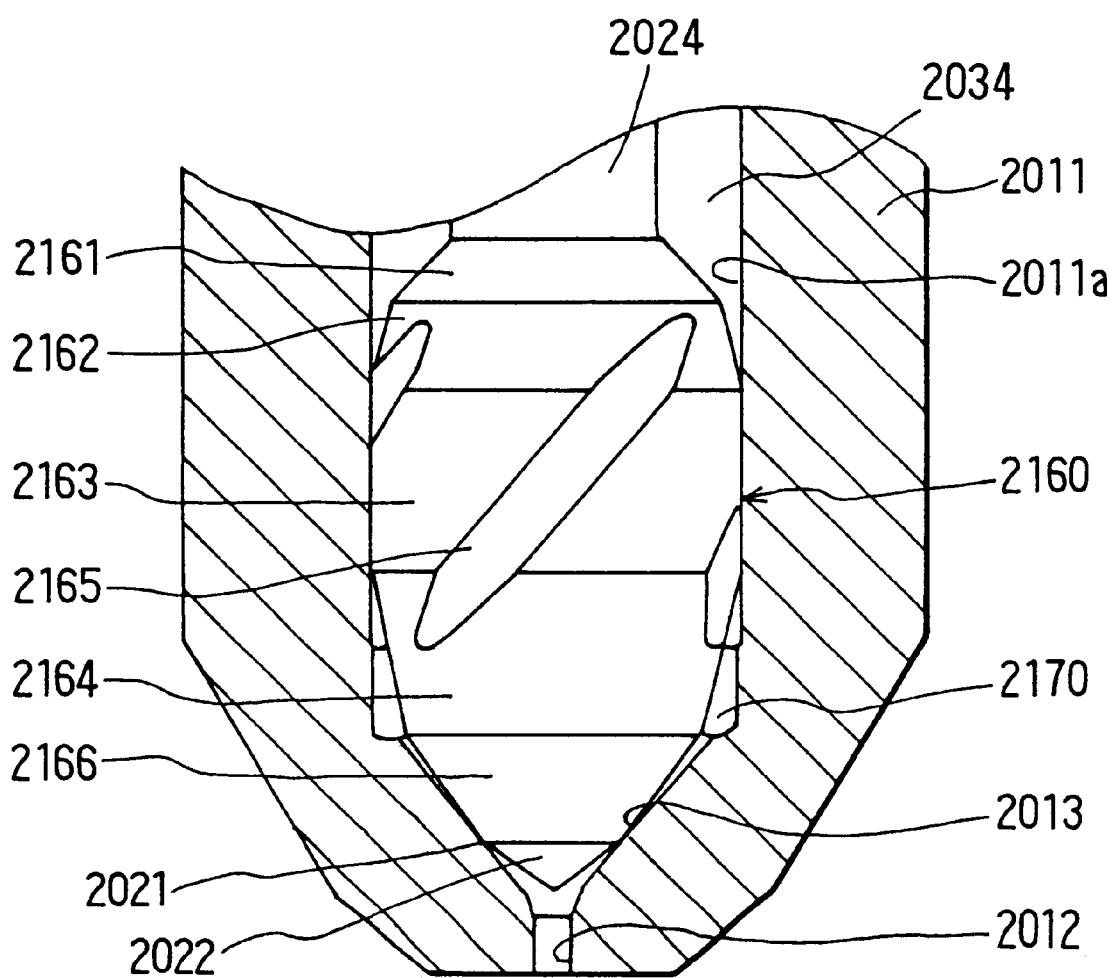
FIG. 39 is an enlarged cross sectional view showing a fuel injector according to a comparative example.
Figure 40A:
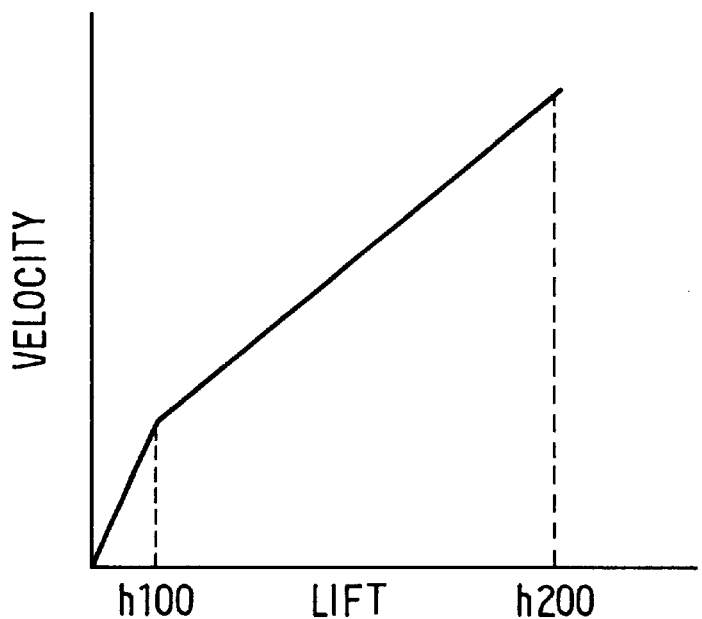
FIGS. 40A and 40B are characteristic diagrams showing the relation between the needle lift and the fuel velocity and the relation between the needle lift and the fuel spray angle in the comparative example.
Figure 40B:
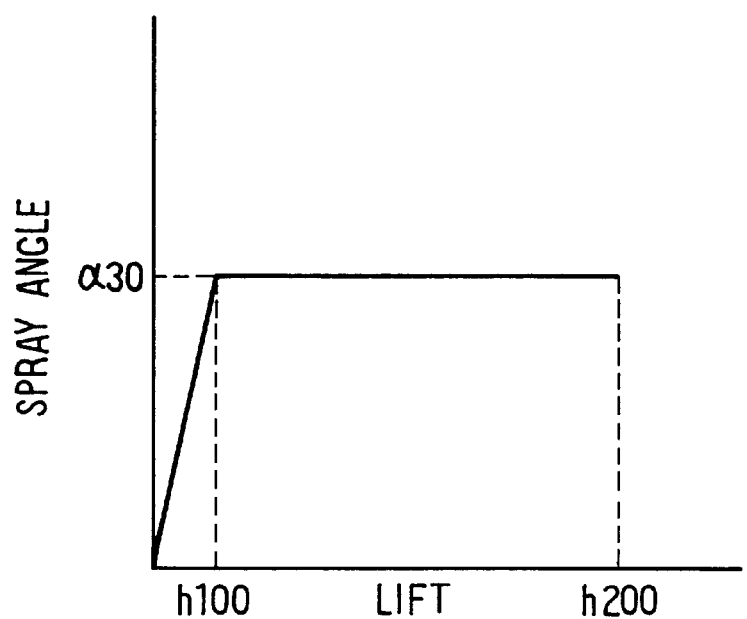

In the comparative example, as illustrated in FIG. 39, a swirl generating part 2160 comprises a first truncated conical part 2161, a second truncated conical part 2162, a cylindrical part 2163, a third truncated conical part 2164, and a fourth truncated conical part 2166. The first truncated conical part 2161 has one end on the small diameter side connected to the large diameter part 2024 and the other end on the large diameter side connected to the second truncated conical part 2162. One end on the small diameter side of the second truncated conical part 2162 is connected to the first truncated conical part 2161 and the other end on the large diameter side is connected to the cylindrical part 2163. The cylindrical part 2163 having the fixed outer diameter is loosely fit in the nozzle body 2011 so as to have a clearance with the inner wall of the nozzle body 2011 and can reciprocate in the axial direction. The cylindrical part 2163 has one end connected to the second truncated conical part 2162 and the other end connected to the third truncated conical part 2164. One end on the large diameter side of the third truncated conical part 2164 is connected to the cylindrical part 2163 and the other end on the small diameter is connected to the fourth truncated conical part 2166. One end on the large diameter side of the fourth truncated conical part 2166 is connected to the third truncated conical part 2164 and the other end on the small diameter side is connected to the conical part 2022.

On the outer walls of the second truncated conical part 2162, the cylindrical part 2163, and the third truncated conical part 2164, four swirl grooves 2165 as fuel inlet passages are formed each extending from a some midpoint of the second truncated conical part 2162 to a some midpoint of the third truncated conical part 2164 so as to be inclined with respect to the axis of the needle.

A swirl chamber 2170 as a swirl generating chamber is formed by the inner wall of the valve seat member 2013 of the nozzle body 2011 and the outer wall of the third truncated conical part 2164 of the swirl generating part 2160.

In the comparative example shown in FIG. 39, the velocity component of the fuel is only the velocity component of the fuel flowing through the swirl grooves 2165. The velocity component ratio is therefore constant irrespective of the lift amount of the needle. More specifically, as illustrated in FIGS. 40A and 40B, as the opening area between the valve seat member 2013 and the contact part 2021 increases according to the lift amount (h) of the needle, the fuel velocity increases. Especially, in a period from the initial lift state where the lift amount (h) of the needle is h1 to the full lift state where the lift amount (h) of the needle increases to h2, the fuel velocity increases almost in proportion to the lift amount (h) of the needle. The angle a of spray is therefore equal to the angle α of spray which is almost constant in the period from the initial lift state to the full lift state. Since the inside diameter of the swirl chamber 2170 in the nozzle body 2011 is relatively large, the volume of the swirl chamber 2170 is relatively large and the swirl chamber 2170 is formed relatively apart from the valve seat member 2013. At the time of the fuel injection starting, therefore, a problem such that it is delayed to swirl the fuel and the fuel spray is not spread in the early stages of the injection occurs.

On the other hand, in the seventh embodiment, since the angle α of fuel spray can be adjusted according to the lift amount (h) of the needle 2020, a desired angle α of spray and desired penetration of the spray can be obtained according to the loading state of the engine. In the initial lifting state at low velocity and low load, a relatively large angle α10 of spray and a relatively short penetration are set. In the full lift state at high speed and high load, a relatively small angle α20 of spray and a relatively long penetration can be set. The atomization of fuel can be therefore promoted and the spray characteristics can be controlled with a simple construction without increasing the number of parts. The fuel consumption can be reduced, the exhaust emission can be reduced, and excellent drivability that the engine is stable can be obtained.

In the seventh embodiment, since the inside diameter of the first swirl chamber 2070 in the nozzle body 2011 is smaller than the outside diameter of each of the cylindrical part 2062 and the second truncated conical part 2063 in the first swirl generating part 2060 in which the first swirl grooves 2065 are formed, the volume of the first swirl chamber 2070 can be made relatively small. Further, since the first swirl chamber 2070 is formed near upstream of the valve seat member 2013, the angle α of spray can be promptly changed in accordance with the lift position of the needle 2020. Thus, a delay in time to generate a fuel swirl can be extremely reduced and a relatively large angle of spray can be set in the beginning of injection, so that atomization of the fuel can be promoted.

Further, in the seventh embodiment, the needle 2020 is centered by the pressure balancing action in the first swirl chamber 2070 and can be held coaxially with the nozzle body 2011, so that deformation of the spray pattern can be prevented.

(EIGHTH EMBODIMENT)

Figure 35:
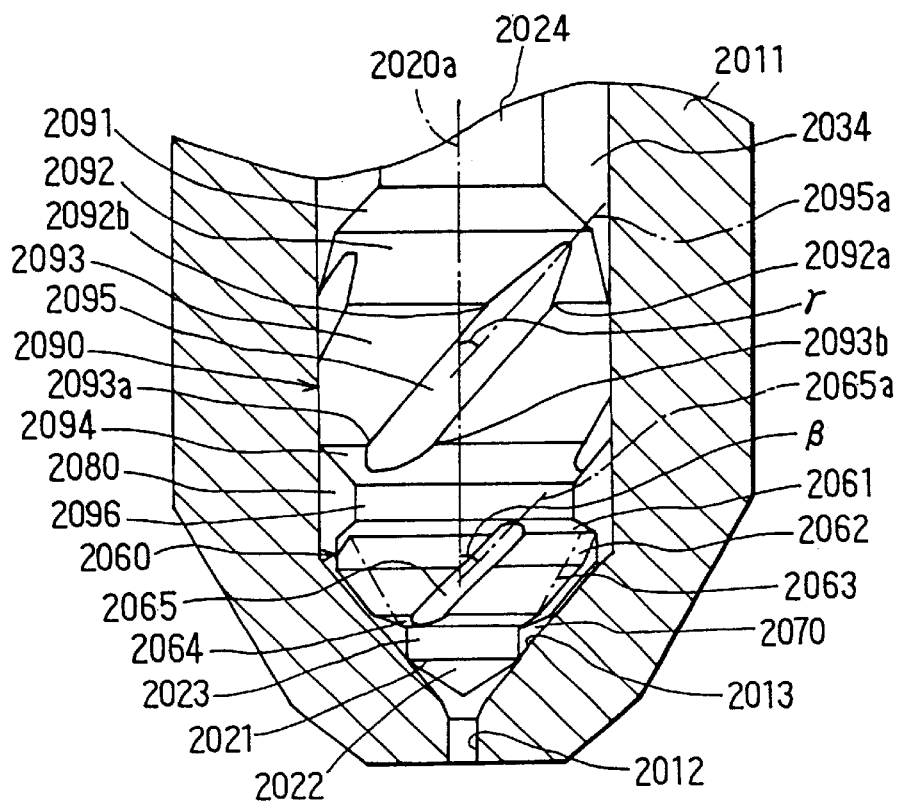
FIG. 35 is an enlarged sectional view showing a fuel injector used in a fuel injection system according to an eighth embodiment of the invention.

As illustrated in FIG. 35, a second swirl generating part 2090 is made up of a first truncated conical part 2091, a second truncated conical part 2091, a first cylindrical part 2093, a third truncated conical part 2094, and a second cylindrical part 2096. One end on the small diameter side of the first truncated conical part 2091 is connected to the large diameter part 2024 and the other end on the large diameter side is connected to the second truncated conical part 2092. One end on the small diameter side of the second truncated conical part 2092 is connected to the first truncated conical part 2091 and the other end on the large diameter side is connected to the first cylindrical part 2093. The first cylindrical part 2093 having the constant diameter is loosely fit in the nozzle body 2011 so as to have a clearance with the inner wall of the nozzle body 2011 and can reciprocate in the axial direction. The first cylindrical part 2093 has one end connected to the second truncated conical part 2092 and the other end connected to the third truncated conical part 2094. One end on the large diameter side of the third truncated conical part 2094 is connected to the first cylindrical part 2093 and the other end on the small diameter side is connected to the second cylindrical part 2096. The second cylindrical part 2096 has one end connected to the third truncated conical part 2094 and the other end connected to the first truncated conical part 2061 of the first swirl generating part 2060.

On the outer walls of the second truncated conical part 2092, the first cylindrical part 2093, and the third truncated conical part 2094, four second swirl grooves 2095 as second fuel inlet passages are formed. Each of the swirl grooves 2095 extends from a some midpoint of the second truncated conical part 2092 to a some midpoint of the third truncated conical part 2094 and is inclined with respect to the axis of the needle.

A second swirl chamber 2080 as a second swirl generating chamber is formed by the inner wall of the nozzle body 2011, the outer wall of the first truncated conical part 2061 in the first swirl generating part 2060, and the outer walls of the third truncated conical part 2094 and the second cylindrical part 2096 in the second swirl generating part 2090. That is, the second swirl chamber 2080 is formed upstream of the first swirl chamber 2070 in the nozzle body 2011.

The center axis 2095a of the second swirl groove 2095 is inclined with respect to the axis 2020a of the needle 2020 at a predetermined angle γ. That is, the first and second swirl grooves 2065 and 2095 form a predetermined angle (β–γ). One, 2092a, of inlet parts of the second swirl groove 2095 is formed at a radius of curvature larger than that of the other inlet part 2092b and one, 2093a, of outlet parts of the second swirl groove 2095 is formed at a radius of curvature larger than that of the other outlet part 2093b. Consequently, a fuel easily flows into the second swirl groove 2095 and easily flows out from the second swirl groove 2095. The second swirl groove 2095 has a shape such that the swirl force is easily exerted on the fuel.

Figure 36:
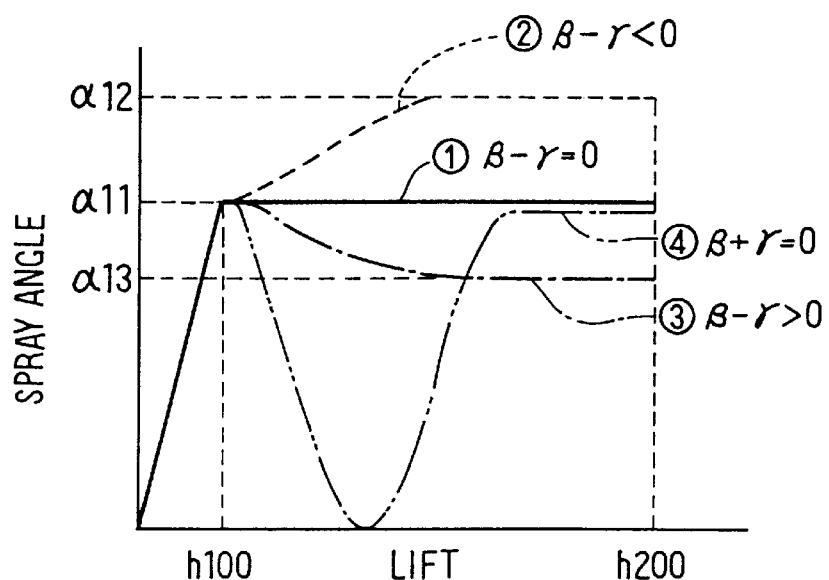
FIG. 36 is a characteristic diagram showing the relation between the needle lift and the fuel spray angle in the eighth embodiment.

The change in the angle of spray when the setting of the angle (β–γ) formed by the first and second swirl grooves 2065 and 2095 is changed will be described with reference to FIG. 36.

(1) case where β–γ=0

Since a velocity vector equivalent to that of the first swirl groove 2065 is created by the swirl generating force of the second swirl groove 2095, an angle α11 of spray which is almost constant is obtained in a period of time from the initial lift state where the lift amount (h) of the needle is equal to h100 to the full lift state where the lift amount (h) of the needle becomes h200.

(2) case where β–γ<0

Since the velocity vector created by the second swirl groove 2095 has a relatively large circumferential component, in the full lift state where the lift amount (h) of the needle is equal to h200, an angle α12 of spray which is relatively large is obtained.

(3) case where β–γ>0

Since the circumferential component becomes relatively small in the velocity vector created by the second swirl groove 2095, a relatively small angle 213 of spray is obtained in the full lift state where the lift amount (h) of the needle is equal to h200.

(4) case where β+γ+=0

Since a velocity vector which has the opposite direction and is equivalent to that of the first swirl groove 2065 is created by the swirl generating force of the second swirl groove 2095, the angle α of spray can be set to zero during the lifting of the needle.

In the eighth embodiment, in the initial period of injection where the opening angle between the contact part 2021 of the needle and the valve seat member 2013 is relatively small, the angle α of spray is determined by the first swirl generating part 2060 on the downstream side. In the latter period of injection where the opening area between the contact part 2021 of the needle and the valve seat member 2013 is relatively large, the angle α of spray is determined by the second swirl generating part 2090 on the upstream side. By arbitrarily setting the angle (β–γ) formed by the first and second swirl grooves 2065 and 2095, therefore, a desired angle α of spray and a desired penetration of spray can be obtained in accordance with a loading state of the engine through the period from the beginning to the end of the injection. The invention can be therefore easily applied to fuel injectors for various types of engines.

Further, in the eighth embodiment, the rotational force in the circumferential direction is loaded from the second swirl generating part 2090 to the first swirl generating part 2060, the needle rotates little by little each time the valve is opened, and the position in the circumferential direction of the needle with respect to the nozzle body 2011 changes. The contact part 2021 of the needle and the valve seat member 2013 can be therefore prevented from being partially worn, so that the durability of the fuel injection nozzle can be improved.

Further, in the eighth embodiment, the needle is centered by the second swirl generating part 2090 and can be 20 held coaxially with the nozzle body 2011, so that the spray pattern can be prevented from being deformed.

(NINTH EMBODIMENT)

Figure 37:
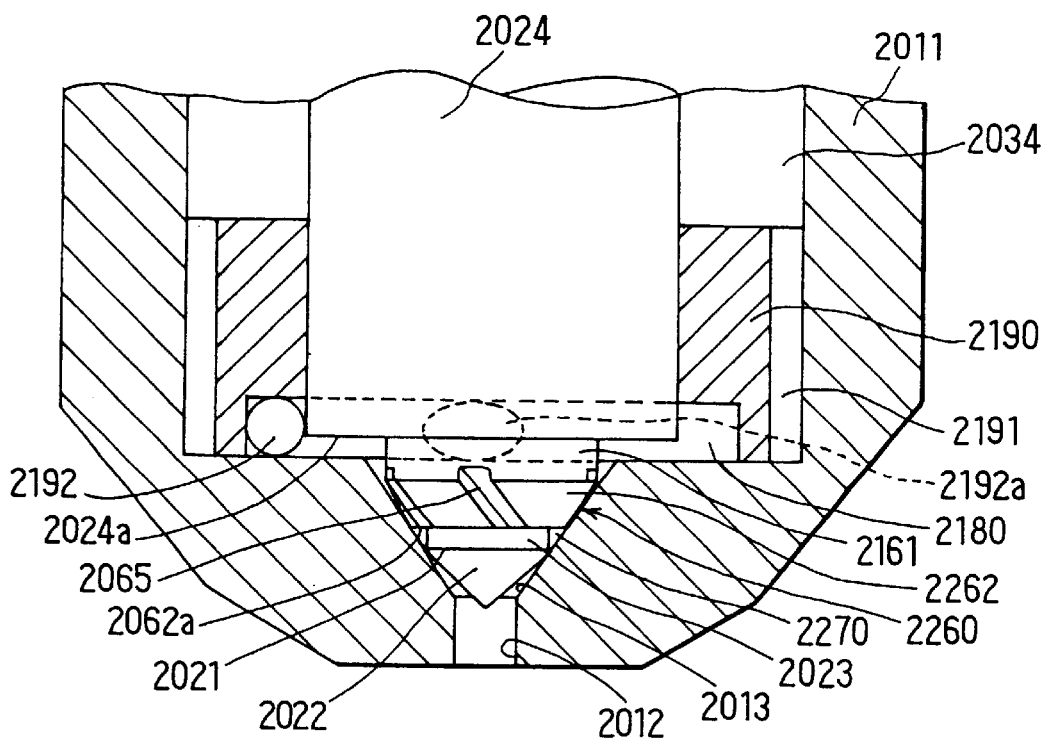
FIG. 37 is an enlarged sectional view showing a fuel injector used in a fuel injection system according to a ninth embodiment of the invention.

As shown in FIG. 37, a first swirl generating part 2260 is comprised of a cylindrical part 2261 and a truncated conical part 2262. The cylindrical part 2261 has one end connected to a large diameter end face 2024a of the large diameter part 2024 and the other end connected to the truncated conical part 2262. One end on the large diameter side of the truncated conical part 2262 is connected to the cylindrical part 2261 and the other end on the small diameter side is connected to the small diameter part 2023. A small diameter side end face 2262a connected to the small diameter part 2023 is formed in the truncated conical part 2262.

On the outer wall of the truncated conical part 2262, four first swirl groove 2265 as first fuel inlet passages are formed so as to be inclined with respect to the axis of the needle in four positions from one end of the truncated conical part 2262 to the other end. The outer surface of the truncated conical part 2262 is formed at the same conical angle or a slightly smaller angle as that of the inner surface of the valve seat member 2013 of the nozzle body 2011. That is, the outer surface of the truncated conical part 2262 faces the inner surface of the valve seat member 2013 in the nozzle body 2011.

A first swirl chamber 2270 as a first swirl generating chamber is constructed by the inner wall of the valve seat member 2013 in the nozzle body 2011, the outer wall of the small diameter part end face 2262a in the first swirl generating part 2260 and the outer wall of the small diameter part 2023 of the needle. The inside diameter of the nozzle body 2011 of a part of the first swirl chamber 2270 is smaller than the outside diameter of the truncated conical part 2262 in the first swirl generating part 2260 in which the first swirl grooves 2265 are formed.

A swirl generator 2190 as a second swirl generating part is fixed to the nozzle body 2011 by press fit. The large diameter part 2024 is loosely fit in the swirl generator 2190 and can reciprocate in the axial direction. The swirl generator 2190 has a hollow cylindrical shape, in which grooves 2191 and swirl holes 2192 are formed. The grooves 2191 are formed in four positions continuously from one end to the other end of the outer wall of the swirl generator 2190 in the axial direction. The grooves 2191 in four positions are arranged so that their center axes are at intervals each of almost 90 degrees. The swirl holes 2192 are formed straight in four positions obliquely in the circumferential direction and horizontally in the axial direction so as to penetrate the outer wall of the swirl generator 2190 in which the grooves 2191 are formed, and the inner wall of the swirl generator 2190. The axial positions of the four swirl holes 2192 are almost the same. On the side opposite to the swirl hole 2192, an opening 2192a which opens toward a second swirl chamber 2180 which will be described hereinlater is formed. The opening 2192a is in a full open state irrespective of the lift position of the needle. The swirl hole 2192 serves as a second fuel inlet passage communicated with the second swirl chamber 2180.

The second swirl chamber 2180 as a second swirl generating chamber is formed by the inner wall of the nozzle body 2011, the outer wall of the large diameter part 2024 and the large diameter part end face 2024a of the needle, the outer wall of the cylindrical part 2261 in the first swirl generating part 2260, and the inner wall of the swirl generator 2190. That is, the second swirl chamber 2180 is formed on the upstream side of the first swirl chamber 2270 in the nozzle body 2011.

Figure 38:
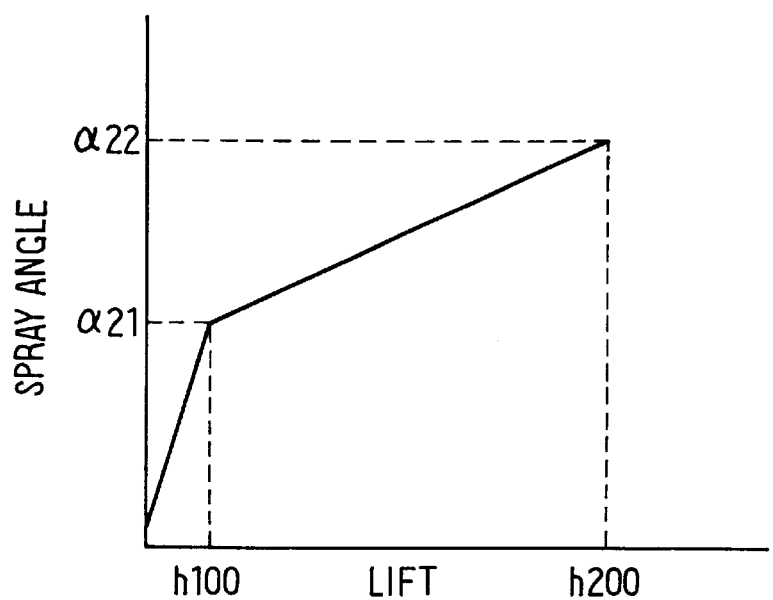
FIG. 38 is a characteristic diagram showing the relation between the needle lift and the fuel spray angle in the ninth embodiment.

In the ninth embodiment, in the beginning of injection when the opening area defined by the contact part 2021 of the needle and the valve seat member 2013 is relatively small, the angle α of spray is determined by the first swirl generating part 2260 on the downstream side. In the latter period of injection when the opening area defined by the contact part 2021 of the needle and the valve seat member 2013 is relatively large, the angle α of spray is determined by the swirl generator 2190 on the upstream side. That is, as illustrated in FIG. 38, as the opening area defined by the valve seat member 2013 and the contact part 2021 increases according to the lift amount (h) of the needle, the velocity of a fuel flowing from the opening part 2192*a* of the swirl hole 2192 into the second swirl chamber 2180 increases and the circumferential velocity component in the second swirl chamber 2180 gradually increases. As the initial lift state where the lift amount (h) of the needle is h100 is shifting to the full lift state where the lift amount (h) of the needle is h200, the angle α of spray increases from α21 to α22. That is, in the full lift state, the relatively large angle α22 of spray and relatively short penetration can be obtained.

Further, in the ninth embodiment, the inside diameter of a part of the first swirl chamber 2270 in the nozzle body 2011 is smaller than the outside diameter of the truncated conical part 2262 of the first swirl generating part 2260 in which the first swirl grooves 2265 are formed, so that the volume of the first swirl chamber 2270 can be made relatively small. Further, since the first swirl chamber 2270 is formed on the upstream side of the valve seat member 2013, the angle α of spray can be promptly changed according to the lift position of the needle. Thus, the delay in time to swirl the fuel can be reduced as much as possible, the relatively large angle of spray can be obtained in the early stages of injection, and atomization of the fuel can be promoted.

Further, in the ninth embodiment, the needle is centered by the swirl generator 2190 and can be held coaxially with the nozzle body 2011, so that the spray pattern can be prevented from being deformed.

Although each of the number of swirl grooves and the number of swirl holes is set to four in the foregoing embodiments, the number of swirl grooves and the number of swirl holes is two or more.

Further, it is to be understood that the fuel injectors in the foregoing embodiments may be used in the fuel injection system of the first embodiment, in such a manner that the nozzle is lifted initially for the pre-injection and is then lifted fully for the main injection by controlling the pressure of fuel supplied from the high pressure pump.

The invention should not be limited to the disclosed embodiments but may be modified further without departing from the spirit of the invention.

What is claimed is:

1. A fuel injection system for an internal combustion engine, comprising:
    fuel injector for directly injecting fuel into a cylinder of an internal combustion engine; and
    control means for executing an injection of the fuel from the fuel injector by a pre-injection and a main injection per cycle of the internal combustion engine,
    wherein the control means controls the fuel injector so that the fuel injected by the pre-injection is formed into a stratified spray of uniform mixture concentration in a predetermined zone in the cylinder at an ignition timing after the pre-injection, and the fuel injected by the main injection passes through the stratified spray zone formed by the pre-injection and burns with an un-used air remaining in a zone in the cylinder other than the predetermined zone; and
    wherein the pre-injection and the main-injection are separated by a non-injection interval.

2. A fuel injection system according to claim 1, wherein the fuel injector is constructed so that the angle of fuel spray formed by the fuel injection can be adjusted, and the control means controls quantity and timing of fuel injection of the fuel injector so that the angle of fuel spray is wider at the time of pre-injection and the angle of fuel spray is narrower at the time of main injection.

3. A fuel injection system according to claim 1, wherein the control means controls fuel injection quantity and fuel injection timing at the time of the pre-injection in accordance with operating conditions of the internal combustion engine so that the fuel spray stratified by the pre-injection is on a lean side in an inflammable mixture limit and cool-flame burned.

4. A fuel injection system according to claim 1, wherein the control means controls fuel injection quantity and fuel injection timing at the time of the main injection in accordance with operating conditions of the internal combustion engine so that the fuel injected by the main injection is perfectly burned in the cylinder and heat generation by the combustion becomes maximum after the top dead center of a piston.

5. A fuel injection system according to claim 1, wherein the control means executes fuel injection from the fuel injector once per cycle of the internal combustion engine at light load of the internal combustion engine.

6. A fuel injection system according to claim 1, wherein the fuel injector includes:
    a nozzle body having a nozzle hole for injecting fuel;
    a needle which is slidably provided in the axial direction in the nozzle body and opens and closes the nozzle hole;
    means for lifting the needle in stages according to a balance between a fuel pressure which biases the needle in a valve opening direction and a biasing force of a plurality of biasing means which urge the needle in a valve closing direction; and
    a fuel passage which is provided between the needle and the nozzle body and by which a rate of injection and spray conditions of a fuel to be injected are changed according to a lift of the needle.

7. A fuel injection system according to claim 6, further comprising:
    first biasing means for biasing the needle in a valve closing direction and second biasing means for biasing the needle in a valve closing direction when the lift of the needle is larger than a first lift.

8. A fuel injection system according to claim 1, wherein the fuel injector includes:
    a nozzle body having a valve seat member upstream of a nozzle hole;
    a needle which is supported by the nozzle body slidably and reciprocally and has a contact part which can seat on the valve seat member, for interrupting and permitting the flow of a fuel by making the contact part unseated and seated on the valve seat member;
    a first swirl flow generating chamber formed in the nozzle body, for generating a swirl flow of a fuel; and
    a first swirl flow generating part which is provided around the needle and has an outer wall in which a first fuel inlet passage communicated with the first swirl flow generating chamber is formed,
    wherein the outer surface of the first swirl flow generating part in which the first fuel inlet passage is formed faces the inner surface of the nozzle body in which the valve seat member is formed.

9. A fuel injection system according to claim 8, wherein the inside diameter of the first swirl flow generating chamber in the nozzle body is smaller than the outside diameter of the first swirl flow generating part in which the first fuel inlet passage is formed.

10. A fuel injection system according to claim 8, further comprising:
- a second swirl flow generating chamber which is formed in the nozzle body upstream of the first swirl flow generating chamber, for generating a swirl flow of a fuel; and
- a second swirl flow generating part which is provided on the outer surface of the needle upstream of the first swirl flow generating part and has an outer wall or an inner wall in which a second fuel inlet passage communicated with the second swirl flow generating chamber is formed.

11. A fuel injection system according to claim 1, further comprising a fuel accumulation chamber for accumulating fuel therein, said fuel accumulation chamber being connected to said fuel injector.

\* \* \* \* \*